United States Patent
Mori et al.

(10) Patent No.: US 12,031,649 B2
(45) Date of Patent: Jul. 9, 2024

(54) DISENGAGEMENT PREVENTION STRUCTURE FOR PIPE CONNECTING PORTION

(71) Applicants: WATERWORKS TECHNOLOGY DEVELOPMENT ORGANIZATION CO., LTD., Osaka (JP); CITY OF KOBE, Kobe (JP)

(72) Inventors: Mitsuhiro Mori, Osaka (JP); Daisuke Sakai, Osaka (JP); Yoshihiro Kumaki, Kobe (JP); Masanori Iga, Kobe (JP)

(73) Assignees: WATERWORKS TECHNOLOGY DEVELOPMENT ORGANIZATION CO., LTD., Osaka (JP); CITY OF KOBE, Kobe (JP)

( * ) Notice: Subject to any disclaimer, the term of this patent is extended or adjusted under 35 U.S.C. 154(b) by 254 days.

(21) Appl. No.: 17/601,789

(22) PCT Filed: Jun. 20, 2019

(86) PCT No.: PCT/JP2019/024476
§ 371 (c)(1),
(2) Date: Oct. 6, 2021

(87) PCT Pub. No.: WO2020/255325
PCT Pub. Date: Dec. 24, 2020

(65) Prior Publication Data
US 2022/0205568 A1    Jun. 30, 2022

(51) Int. Cl.
*F16L 27/12*    (2006.01)
*F16L 21/04*    (2006.01)
(Continued)

(52) U.S. Cl.
CPC ........... *F16L 27/12* (2013.01); *F16L 21/04* (2013.01); *F16L 21/065* (2013.01); *F16L 27/12751* (2019.08); *F16L 57/00* (2013.01)

(58) Field of Classification Search
CPC ....... F16L 21/007; F16L 21/04; F16L 21/045; F16L 21/06; F16L 21/065; F16L 27/12751; F16L 57/00; F16L 21/08
See application file for complete search history.

(56) References Cited

FOREIGN PATENT DOCUMENTS

| JP | 58191486 U | 12/1983 |
| JP | JUM63-59290 U | 4/1988 |

(Continued)

OTHER PUBLICATIONS

JPH0914570A—Machine Translation—English (Year: 1997).*
(Continued)

*Primary Examiner* — William S. Choi
(74) *Attorney, Agent, or Firm* — The Webb Law Firm

(57) ABSTRACT

A collar having a divided structure and surrounding a fitting connection part between a spigot portion and a socket portion in a sealed state is externally mounted over both pipe portions. A first disengagement blocking part that blocks, by contact, a relative disengagement movement beyond a certain level between the socket portion and the collar is provided at a location where the collar and the socket portion side face each other. A second disengagement blocking part provided with a retaining part in which falling-off resistance between the retaining part and an outer peripheral surface of the spigot portion increases according to a disengagement movement of the spigot portion is provided on a pipe support portion side on one end side in a pipe axis direction of the collar.

10 Claims, 25 Drawing Sheets

(51) Int. Cl.
  *F16L 21/06*   (2006.01)
  *F16L 57/00*   (2006.01)

(56) References Cited

FOREIGN PATENT DOCUMENTS

| JP | H0914569 | A | * | 1/1997 | ............. F16L 57/00 |
| JP | H0914570 | A | * | 1/1997 | ............. F16L 57/00 |
| JP | 2001187996 | A |   | 7/2001 | |
| JP | 2015124886 | A | * | 7/2015 | ............. F16L 21/08 |
| JP | 201680129 | A |   | 5/2016 | |
| JP | 2016138637 | A |   | 8/2016 | |

OTHER PUBLICATIONS

JPH0914569A—Machine Translation—English (Year: 1997).*
JP2016138637A—Machine Translation—English (Year: 2016).*
JP2015124886A—Machine Translation—English (Year: 2017).*
Office Action issued in JP2019114420 on May 31, 2023.

* cited by examiner

DISENGAGEMENT PREVENTION STRUCTURE FOR PIPE CONNECTING PORTION

CROSS-REFERENCE TO RELATED APPLICATION

This application is the United States national phase of International Application No. PCT/JP2019/024476 filed Jun. 20, 2019, the disclosure of which is hereby incorporated by reference in its entirety.

BACKGROUND OF THE INVENTION

Field of the Invention

The present invention relates to a disengagement prevention structure for a pipe connecting portion, in which a collar having a divided structure and surrounding a fitting connection part between a spigot portion of a pipe portion on one side and a socket portion of a pipe portion on the other side in a sealed state is externally mounted over both pipe portions.

Description of Related Art

As the disengagement prevention structure for a pipe connecting portion described above, there is a pipe mounting structure shown in PTL 1. In this pipe mounting structure, a fitting connection part between a spigot portion of a pipe portion on one side and a socket portion of a pipe portion on the other side is configured with a K-shaped mechanical joint. In this mechanical joint, a seal material such as a rubber ring is mounted between an outer peripheral surface of the spigot portion and a tapered inner peripheral surface of the socket portion. A flange portion of a push ring provided with a pressing portion capable of pressing the seal material from a pipe axis direction and a flange portion of the socket portion are fastened and connected to each other with a bolt and a nut. Due to this fastening connection, the seal material is compressed in a watertight state by the pressing portion of the push ring which is drawn and fixed to the flange portion of the socket portion, as a result of which the watertight state is maintained.

Further, a collar having a divided structure and surrounding the mechanical joint that serves as the fitting connection part in a sealed state includes, as main configurations, a peripheral wall portion having a cylindrical shape having a diameter larger than that of the socket portion, annular side wall portions that integrally extend inward in a radial direction from both ends in the pipe axis direction of the peripheral wall portion, and a pipe support portion that integrally extends outward along the pipe axis direction from the inner diameter-side end portion of each of the side wall portions.

A seal part equipped with a seal material for sealing a gap between the outer peripheral surfaces of both pipe portions is provided on each of the inner peripheral surfaces of both pipe support portions of the collar.

Further, disengagement movement blocking means for blocking, by contact, a relative disengagement movement beyond a certain level between the socket portion and the collar is provided at a location where the collar and the socket portion side of the pipe portion on the other side face each other in the pipe axis direction. In the disengagement movement blocking means, the inner diameter of the pipe support portion on the other end side of the collar, which is the socket portion side, is formed to have a diameter smaller than the maximum outer diameter of a tapered portion of the socket portion. When the spigot portion and the socket portion are disengaged from each other, the pipe support portion on the other end side of the collar comes into contact with the tapered portion of the socket portion from the pipe axis direction to block further disengagement movement.

Further, a disengagement restricting part having a divided structure and provided with a locking member that bites into the outer peripheral surface clamps and is fixed to the outer peripheral surface of the spigot portion that is located within the collar. The outer diameter of the disengagement restricting part is formed to be larger than the inner diameter of the pipe support portion on one end side of the collar, which is the spigot portion side. When the spigot portion and the socket portion are disengaged from each other, the disengagement restricting part clamping and fixed to the spigot portion comes into contact with the pipe support portion on one end side of the collar from the pipe axis direction to block further disengagement movement.

CITATION LIST

Patent Literature

[PTL 1] JP-A-2016-138637

In the pipe mounting structure shown in PTL 1, when the spigot portion and the socket portion are disengaged from each other, the disengagement restricting part clamping and fixed to the spigot portion merely comes into contact with the pipe support portion on one end side of the collar from the pipe axis direction, and has no function of restricting bending between the spigot portion and the pipe support portion on one end side of the collar. Therefore, there is a disadvantage that when the spigot portion and the socket portion are disengaged from each other, the spigot portion and the pipe support portion on one end side of the collar are greatly bent, so that the sealing performance in a circumferential direction of the seal part provided on the inner peripheral surface of the pipe support portion on one end side of the collar is locally reduced and leakage of a fluid occurs from the location where the sealing performance is reduced.

SUMMARY OF THE INVENTION

In view of this situation, a main object of the present invention is to provide a disengagement prevention structure for a pipe connecting portion, in which it is possible to reliably block disengagement movements of a spigot portion and a socket portion with respect to a collar while improving absorption capacity with respect to a disengagement force, and maintain the bent state between the spigot portion and a pipe support portion on one end side of the collar within an appropriate range to suppress leakage of a fluid due to a local decrease in sealing in a circumferential direction of a seal part.

A first characteristic configuration of a disengagement prevention structure for a pipe connecting portion according to the present invention includes: a collar having a divided structure and surrounding a fitting connection part between a spigot portion of a pipe portion on one side and a socket portion of a pipe portion on the other side in a sealed state, the collar being externally mounted over the both pipe portions; a first disengagement blocking part, which allows a relative disengagement movement to a disengaged state where connection of the socket portion and the spigot portion is released, and blocks, by contact, a relative disengagement movement beyond a certain level between the socket portion and the collar in the disengaged state, the first disengagement blocking part being provided at a location where the collar and a socket portion side of the pipe portion on the other side face each other in a pipe axis direction; and a second disengagement blocking part provided with a retaining part in which falling-off resistance between the retaining part and an outer peripheral surface of the spigot portion increases according to a disengagement movement of the spigot portion, the second disengagement blocking part being provided on a pipe support portion side on one end side in a pipe axis direction of the collar.

According to the above configuration, due to the first disengagement blocking part provided at the location where the collar and the socket portion side of the pipe portion on the other side face each other in the pipe axis direction, when a disengagement force due to an earthquake, uneven settlement, or the like acts on the fitting connection part between the spigot portion and the socket portion, a relative disengagement movement to the disengaged state where the connection of the socket portion and the spigot portion is released is allowed. In this way, it is possible to absorb a large disengagement force acting on the fitting connection part between the spigot portion and the socket portion. Nevertheless, since it is possible to reliably block, by contact, a relative disengagement movement beyond a certain level between the socket portion and the collar in the disengaged state, the socket portion does not fall out with respect to the pipe support portion on the other end side of the collar.

Further, in the retaining part of the second disengagement blocking part provided on the pipe support portion side on one end side in the pipe axis direction of the collar, falling-off resistance between the retaining part and the outer peripheral surface of the spigot portion increases according to the disengagement movement of the spigot portion with respect to the pipe support portion on one end side of the collar, and therefore, as a whole, the spigot portion of the pipe portion on one side and the pipe support portion on one end side of the collar are integrally and firmly fixed and connected to each other through the second disengagement blocking part.

In this way, even if the spigot portion and the socket portion are disengaged from each other, each of the falling-out movement of the socket portion with respect to the pipe support portion on the other end side of the collar and the falling-out movement of the spigot portion with respect to the pipe support portion on one end side of the collar can be firmly blocked.

Moreover, due to the original pipe support function at the pipe support portion on one end side of the collar and the pipe support function by the retaining part of the second disengagement blocking part, it is possible to support two locations spaced apart from each other in the pipe axis direction in the spigot portion of the pipe portion. In this way, even if a bending force is produced due to an earthquake, an unequal force due to fluid pressure, or the like when a disengagement movement has occurred to the disengaged state where the connection of the spigot portion and the socket portion is released, it is possible to suppress bending between the spigot portion and the pipe support portion on one end side of the collar.

Therefore, the ability to absorb the disengagement force acting on the fitting connection part is improved by a relative disengagement movement to the disengaged state where the connection of the socket portion and the spigot portion is released. Nevertheless, when the spigot portion and the socket portion are moved and disengaged from each other to the disengaged state, further disengagement movement is reliably blocked by cooperation of the first disengagement blocking part and the second disengagement blocking part, thereby to prevent leakage of a fluid. Moreover, the bent state between the spigot portion and the pipe support portion on one end side of the collar in the disengaged state is maintained within an appropriate range, thereby to suppress leakage of a fluid due to a local decrease in sealing in the circumferential direction of the seal part.

A second characteristic configuration of the present invention is that a tilt restricting part that restricts tilt of the spigot portion with respect to the pipe support portion on one end side of the collar in the disengaged state is provided within the collar.

According to the above configuration, even if a bending force is produced due to an earthquake, an unequal force due to fluid pressure, or the like when the spigot portion and the socket portion are in the disengaged state, owing to the tilt restricting part provided within the collar, it is possible to restrict the tilt of the spigot portion with respect to the pipe support portion on one end side of the collar. In this way, the bent state between the spigot portion and the pipe support portion on one end side of the collar in the disengaged state is maintained within an appropriate range, thereby to further suppress leakage of a fluid due to a local decrease in sealing in the circumferential direction of the seal part.

A third characteristic configuration of the present invention is that the tilt restricting part includes a tilt restricting element having a divided structure, which is externally mounted to the spigot portion in a state where the socket portion and the spigot portion are fitted and connected to each other and the disengaged state, and has a tilt restricting surface capable of coming into contact with an outer surface of the spigot portion that is tilted in the disengaged state, and a fixing connection part that fixedly connects the tilt restricting element to the socket portion.

According to the above configuration, in a state where the socket portion and the spigot portion are fitted and connected to each other, the tilt restricting element having a divided structure, of the tilt restricting part, is externally mounted to the spigot portion, and is fixedly connected to the socket portion by the fixing connection part. Even when the socket portion and the spigot portion relatively move to be disengaged from each other to the disengaged state due to an earthquake, uneven settlement, or the like, the tilt restricting element is maintained in a state of being externally mounted to the spigot portion. Therefore, when a bending force is produced due to an earthquake, an unequal force due to fluid pressure, or the like in the disengaged state, the tilt restricting surface of the tilt restricting element fixedly connected to the socket portion and the outer surface of the spigot portion come into contact with each other. In this way, the bent state between the spigot portion and the pipe support portion on one end side of the collar in the disengaged state is reliably maintained within an appropriate range, as a result of which it is possible to further suppress leakage of a fluid due to a local decrease in sealing in the circumferential direction of the seal part.

A fourth characteristic configuration of the present invention is that the tilt restricting element is provided with a tilt restricting protrusion portion that comes into contact with an inner surface of the collar with tilt of the spigot portion in the disengaged state.

According to the above configuration, when a bending force is produced due to an earthquake, an unequal force due to fluid pressure, or the like in the disengaged state, the tilt restricting surface of the tilt restricting element fixedly connected to the socket portion and the outer surface of the spigot portion come into contact with each other, and the tilt restricting protrusion portion of the tilt restricting element comes into contact with the inner surface of the collar. Due to the contacts on the inner side and the outer side in the pipe radial direction, the bent state between the spigot portion and the pipe support portion on one end side of the collar in the disengaged state can be reliably maintained within an appropriate range, thereby to further suppress leakage of a fluid due to a local decrease in sealing in the circumferential direction of the seal part.

A fifth characteristic configuration of the present invention is that the tilt restricting protrusion portion is configured such that a contact position with respect to the inner surface of the collar is changeable in a pipe radial direction.

According to the above configuration, when the tilt restricting element having a divided structure, of the tilt restricting part, is externally mounted to the spigot portion, there is a scene in which the socket portion and the spigot portion are bent at the fitting connection part. Even in this case, it is possible to change the contact position of the tilt restricting protrusion portion in the pipe radial direction according to the actually measured distance between a protrusion forming location of the tilt restricting element and a protrusion contact location in the inner peripheral surface of the collar. In this way, even in the scene where the socket portion and the spigot portion are bent at the fitting connection part, it is possible to efficiently and reliably perform work of externally assembling the tilt restricting part to the spigot portion. Moreover, when a bending force is produced due to an earthquake, an unequal force due to fluid pressure, or the like in the disengaged state, it is possible to accurately bring the tilt restricting protrusion portion of the tilt restricting element into contact with the inner surface of the collar.

A sixth characteristic configuration of the present invention is that the fitting connection part includes a seal member that is mounted between an outer peripheral surface of the spigot portion and a tapered inner peripheral surface of the socket portion, a push ring that is movably and externally mounted to the spigot portion and has a pressing portion capable of pressing the seal member from the pipe axis direction, and a fastener that fastens and fixes the socket portion and the push ring from the pipe axis direction, in which the fixing connection part of the tilt restricting part is configured with the fastener of the fitting connection part.

According to the above configuration, when the socket portion and the push ring are fastened and fixed to each other from the pipe axis direction with the fastener, the seal member mounted between the outer peripheral surface of the spigot portion and the tapered inner peripheral surface of the socket portion is compressed in a sealed state by the pressing portion of the push ring. It is possible to reliably and firmly fix and connect the fixing connection part of the tilt restricting part to the socket portion by using the fastener for the push ring for sealing the fitting connection part.

A seventh characteristic configuration of the present invention is that the fitting connection part includes a seal holding groove that is formed on the inner peripheral surface of the socket portion and is open inward in the radial direction, and a seal member that is compressed in a sealed state against the outer peripheral surface of the spigot portion fitted and connected to the socket portion and mounted into the seal holding groove, and wherein the fixing connection part of the tilt restricting part is composed of an engagement protrusion provided at the tilt restricting element in a state of being engageable with an annular protrusion formed at an end portion of the outer peripheral surface of the socket portion from the outer side in the pipe radial direction, and a fastener that fastens and fixes divided tilt restricting members of the tilt restricting element in a state of clamping the spigot portion, in a state where the engagement protrusion of the tilt restricting element is engaged with the annular protrusion of the socket portion.

According to the above configuration, when the socket portion and the spigot portion are fitted and connected to each other, the seal member mounted into the seal holding groove on the inner peripheral surface of the socket portion is compressed in a sealed state on the outer peripheral surface of the spigot portion. The engagement protrusion provided at the tilt restricting element is engaged with the annular protrusion of the socket portion from the outer side in the pipe radial direction by using the annular protrusion formed at the end portion of the outer peripheral surface of the socket portion to form the fitting connection part. In this engaged state, by fastening and fixing the divided tilt restricting members of the tilt restricting element with fasteners, it is possible to reliably and firmly fix and connect the fixing connection part of the tilt restricting part to the socket portion.

An eighth characteristic configuration of the present invention is that the first disengagement blocking part includes a contact surface formed on the other end side in the pipe axis direction in an inner surface between the both pipe support portions of the collar, and a contact member fixed to the socket portion side in a state of facing the contact surface in the pipe axis direction, in which the contact surface of the collar and a contact surface of the contact member are formed on orthogonal planes orthogonal to a pipe axis.

According to the above configuration, in the first disengagement blocking part, when a disengagement force due to an earthquake, uneven settlement, or the like acts on the fitting connection part between the spigot portion and the socket portion, the contact surface formed on the other end side in the pipe axis direction in the inner surface between both pipe support portions of the collar and the contact member fixed to the socket portion side come into contact with each other from the pipe axis direction, as a result of which further disengagement movement between the pipe portion on the socket portion side and the collar is blocked. At this time, since the contact surface of the collar and the contact surface of the contact member on the socket portion side are formed on orthogonal planes orthogonal to the pipe axis, the contact surface of the collar and the contact surface of the contact member are in a surface contact state along the orthogonal direction. In this way, the disengagement force is reliably received, thereby to improve the disengagement blocking effect. Further, the pushing-opening force of the divided joint portion acting on the collar at the time of contact is reduced, as a result of which a decrease in sealing performance at the divided joint portion of the collar can be suppressed.

A ninth characteristic configuration of the present invention is that the first disengagement blocking part forms a disengagement blocking portion, which comes into contact with a tapered outer peripheral surface portion in the outer peripheral surface of the socket portion from the pipe axis direction, on the other end side in the pipe axis direction in an inner surface between the both pipe support portions of the collar, and the disengagement blocking portion has a contact surface formed in a tapered shape having the same gradient as the tapered outer peripheral surface portion in the outer peripheral surface of the socket portion.

According to the above configuration, in the first disengagement blocking part, when a disengagement force due to an earthquake, uneven settlement, or the like acts on the fitting connection part between the spigot portion and the socket portion, the disengagement blocking portion formed on the other end side in the pipe axis direction in the inner surface between both pipe support portions of the collar and the tapered outer peripheral surface portion in the outer peripheral surface of the socket portion come into contact with each other, as a result of which further disengagement movement between the disengagement blocking portion and the tapered outer peripheral surface portion can be blocked. At this time, since the contact surface of the disengagement blocking portion is formed in a tapered shape having the same gradient as the tapered outer peripheral surface portion in the outer peripheral surface of the socket portion, the contact surface of the disengagement blocking portion and the tapered outer peripheral surface portion of the socket portion come into contact with each other in a surface contact state, thereby to firmly block the disengagement movement between the contact surface of the disengagement blocking portion and the tapered outer peripheral surface portion of the socket portion.

Moreover, when the disengagement blocking portion of the collar comes into contact with the tapered portion of the outer peripheral surface of the socket portion, a force to push and open the divided surface of the collar having a divided structure is generated. However, in the present invention, since the disengagement blocking portion of the collar is formed on the other end side in the pipe axis direction between both pipe support portions of the collar, the pushing-opening force is reduced by the amount corresponding to a shift allowance from both pipe support portions, as a result of which it is possible to suppress the occurrence of leakage of a fluid due to a decrease in the sealing performance of the seal part according to the pushing-opening of the divided surface of the collar.

A tenth characteristic configuration of the present invention is that a connection part of the second disengagement blocking part is configured with an engagement protrusion that is detachably engaged with an engagement recess formed on an outer peripheral surface of the pipe support portion on one end side of the collar, from an outer side in the pipe radial direction.

According to the above configuration, since the engagement protrusion forming the connection part of the second disengagement blocking part is engaged with the engagement recess formed on the outer peripheral surface of the pipe support portion on one end side of the collar from the outer side in the pipe radial direction, when the spigot portion and the socket portion are disengaged from each other, it is possible to suppress bending between the spigot portion of the pipe portion on one side and the pipe support portion on one end side of the collar. In this way, the bent state between the spigot portion of the pipe portion and the pipe support portion on one end side of the collar is maintained within a more appropriate range, thereby to suppress leakage of a fluid due to a local decrease in the sealing performance in the circumferential direction of the seal part.

DESCRIPTION OF THE INVENTION

Figure 1:
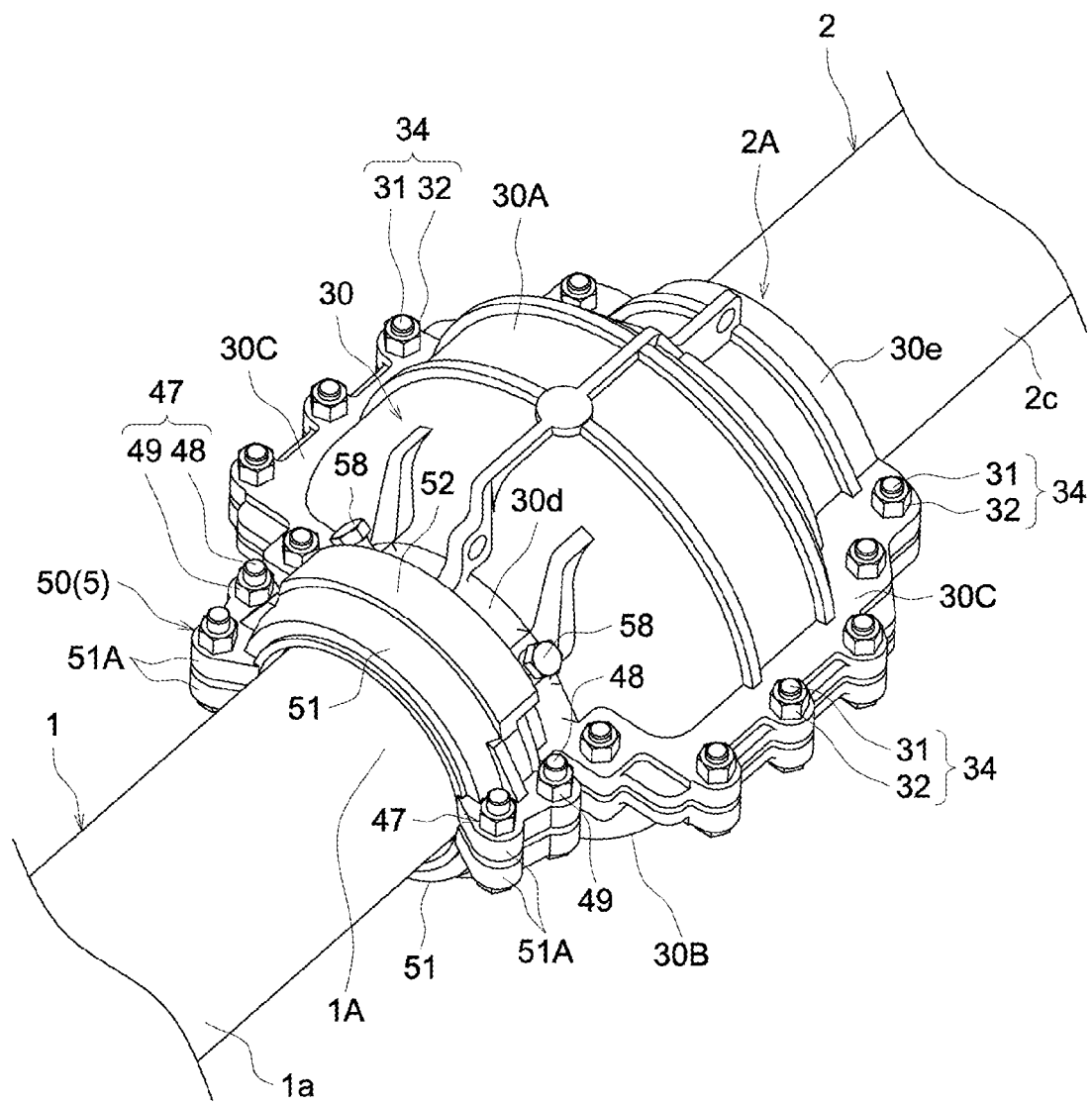
FIG. 1 is a perspective view showing a first embodiment of a disengagement prevention structure for a pipe connecting portion.

Embodiments of the present invention will be described based on the drawings.

First Embodiment

FIGS. 1 to 4 show a disengagement prevention structure for a pipe connecting portion which is used in a fluid transportation pipe system. In the disengagement prevention structure for a pipe connecting portion, a spigot portion 1A of a fluid pipe 1, which is an example of a pipe portion on one side, and a socket portion 2A of a fluid pipe 2, which is an example of a pipe portion on the other side, are connected to each other by a fitting connection part 20. A collar 30 having a divided structure and surrounding the fitting connection part 20 in a sealed state is externally mounted over both fluid pipes 1 and 2.

Figure 2:
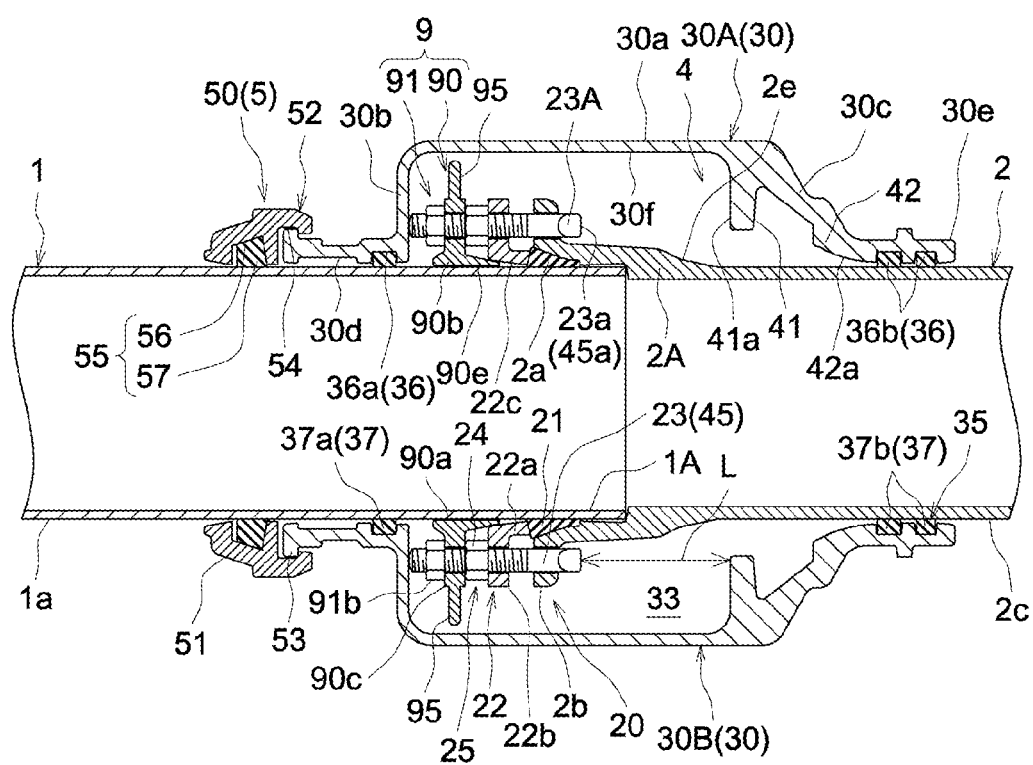
FIG. 2 is an overall sectional view at the time of assembly.
Figure 3:
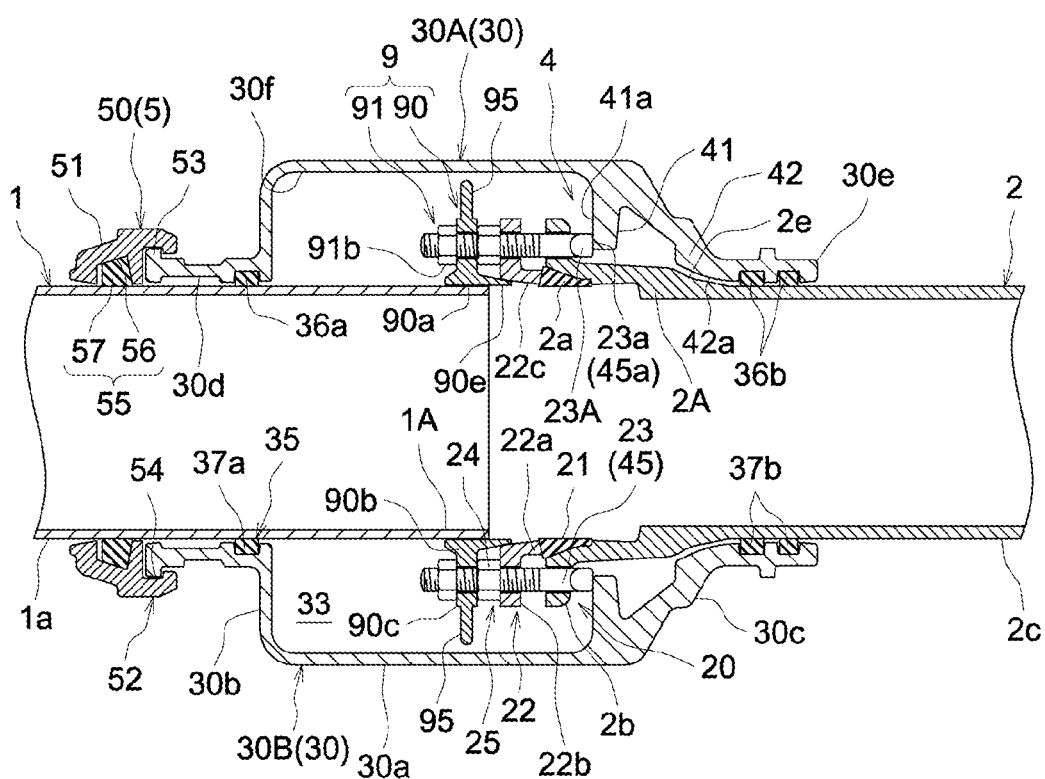
FIG. 3 is an overall sectional view at the time of disengagement.

As shown in FIGS. 2 and 3, a first disengagement blocking part 4, which allows a relative disengagement movement to the disengaged state where the connection of the socket portion 2A and the spigot portion 1A is released, and blocks, by contact, a relative disengagement movement beyond a certain level between the socket portion 2A and the collar 30 in the disengaged state, is provided at a location where the collar 30 and the socket portion 2A side of the fluid pipe 2 on the other side face each other in a pipe axis direction.

As shown in FIGS. 2 and 3, a second disengagement blocking part 5 having a divided structure is provided at the spigot portion 1A of the fluid pipe 1 on one side. The second disengagement blocking part 5 includes a connection part 52 that is fixedly connected to a pipe support portion 30d on one end side in the pipe axis direction of the collar 30, and a retaining part 55 in which falling-off resistance between the retaining part 55 and an outer peripheral surface 1a of the spigot portion 1A increases according to the disengagement movement of the spigot portion 1A with respect to the pipe support portion 30d on one end side of the collar 30.

A tilt restricting part 9, which restricts the tilt of the spigot portion 1A with respect to the pipe support portion 30d on one end side of the collar 30 in the disengaged state where the connection between the socket portion 2A and the spigot portion 1A is released, is provided within the collar 30.

In the disengagement prevention structure for a pipe connecting portion described above, as the pipe portions, the fluid pipes 1 and 2 are given as examples. However, as the pipe portions, in the related art, there are various types of pipe portions. For example, although not shown in the drawings, a branch pipe portion of a T-pipe having a divided structure, which is externally mounted and fixed to a fluid pipe in a sealed state, a branch pipe portion that is integrally formed to protrude from a fluid pipe, a pipe portion that configures a part of fluid equipment, or the like can be given.

Further, the fluid pipes 1 and 2 in the present embodiment are ductile cast iron pipes configuring a water pipe for transporting tap water, which is an example of a fluid. However, other cast iron pipes, steel pipes, or the like can be used, and as the fluid, in addition to clean water, industrial water, gas, or the like can be given as an example.

As shown in FIGS. 1 to 3, the fitting connection part 20 between the spigot portion 1A of the fluid pipe 1 on one side and the socket portion 2A of the fluid pipe 2 on the other side is configured with a K-shaped mechanical joint. In the K-shaped mechanical joint, a first seal member 21 such as a rubber ring is mounted between the outer peripheral surface 1a of the spigot portion 1A and a tapered inner peripheral surface 2a of the socket portion 2A. A push ring 22 provided with a pressing portion 22a capable of pressing the first seal member 21 from the pipe axis direction is externally mounted to the spigot portion 1A. A flange portion 22b of the push ring 22 and a flange portion 2b of the socket portion 2A are fastened and connected to each other from the pipe axis direction by first fasteners 25 such as a plurality of metal T-head bolts 23 and nuts 24 which are disposed at predetermined intervals in a pipe circumferential direction. Due to the fastening connection by the first fasteners 25, the first seal member 21 is compressed in a sealed state (watertight state) by the pressing portion 22a of the push ring 22 which is drawn and fixed to the flange portion 2b of the socket portion 2A, and the sealed state is maintained.

Figure 4:
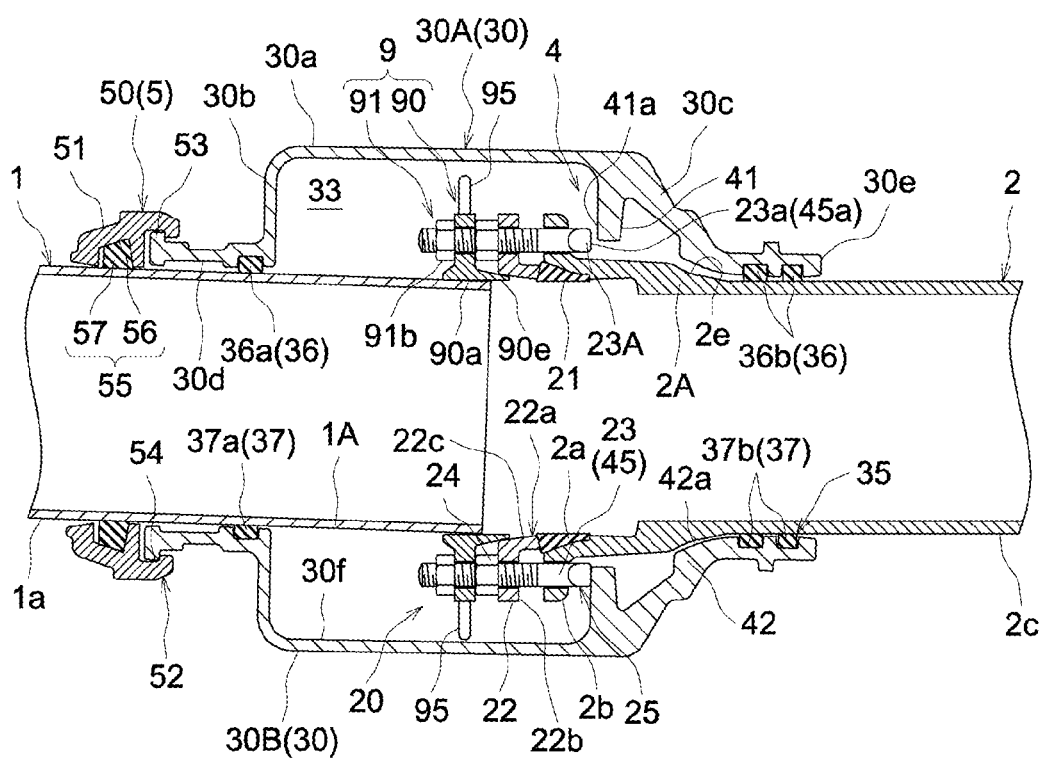
FIG. 4 is an overall sectional view showing a bending restricting operation in a disengaged state.
Figure 5:
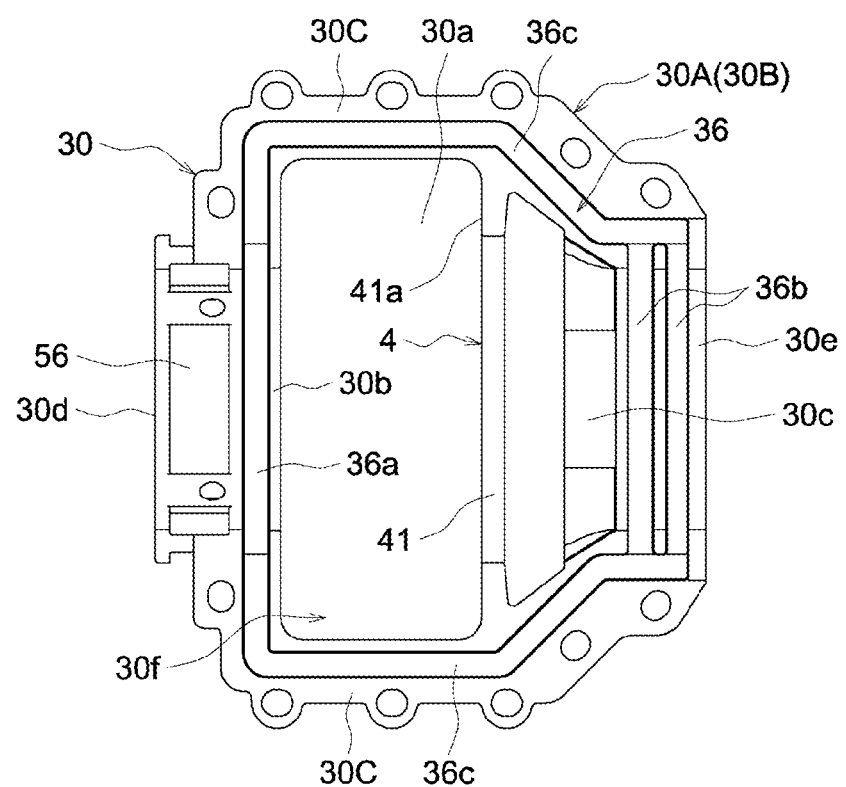
FIG. 5 is an inside view of a divided collar case of a collar.

As shown in FIGS. 1 to 5, the collar 30 is composed of divided collar cases 30A and 30B made of cast iron and having a two-divided structure capable of externally mounted over both fluid pipes 1 and 2 in a state of surrounding the fitting connection part 20 between both fluid pipes 1 and 2. The divided collar cases 30A and 30B are configured to have the same shape, as shown in FIGS. 2 and 5.

The collar 30 includes, as main configurations, a peripheral wall portion 30a having a cylindrical shape having a diameter larger than that of the socket portion 2A, annular side wall portions 30b and 30c integrally extending inward in the radial direction from both ends in the pipe axis direction of the peripheral wall portion 30a, and tubular pipe support portions 30d and 30e integrally extending outward along the pipe axis direction from the end portions on the inner diameter side of the side wall portions 30b and 30c. The side wall portion 30b on one end side, which is the spigot portion 1A side, is configured as a vertical side wall portion orthogonal to or substantially orthogonal to a pipe axis. The side wall portion 30c on the other end side, which is the socket portion 2A side, is configured as a tapered side wall portion whose diameter decreases toward the pipe support portion 30e side that is continuous with the side wall portion 30c.

As shown in FIGS. 1 and 5, connection flange portions 30C protruding to the outer side in the horizontal direction are integrally formed at both end portions in the pipe circumferential direction of each of the divided collar cases 30A and 30B of the collar 30. The connection flange portions 30C of the divided collar cases 30A and 30B are fixedly connected to each other in a sealed state (watertight state) by fastening of a second fastener 34 such as a bolt 31 and a nut 32. As shown in FIG. 2, a seal part 35 (refer to FIG. 2), which seals a surrounding space 33 that is formed between an inner peripheral surface 30f of the collar 30 (refer to FIG. 2) and the outer peripheral surfaces 1a and 2c of both fluid pipes 1 and 2 including the fitting connection part 20 with respect to the outside, is provided in the divided collar cases 30A and 30B.

As shown in FIGS. 2 and 3, the seal part 35 is configured by mounting a second seal member 37 such as an annular gasket into an annular seal holding groove 36 formed in each of the divided collar cases 30A and 30B.

As shown in FIG. 5, the seal holding groove 36 includes a first circumferential direction groove portion 36a formed along a pipe circumferential direction on the inner surface of the pipe support portion 30d facing the semi-outer-peripheral surface of the spigot portion 1A, two sets of second circumferential direction groove portions 36b formed along the pipe circumferential direction on the inner surface of the pipe support portion 30e facing the semi-outer-peripheral surface of the socket portion 2A and at an interval in the pipe axis direction, and pipe axial direction groove portions 36c formed along the divided surfaces of both connection flange portions 30C in a state of communicating with the circumferential direction end portions of the first and second circumferential direction groove portions 36a and 36b.

As shown in FIGS. 2 and 3, the second seal member 37 is configured by integrally molding a first circumferential direction seal portion 37a that is mounted into the first circumferential direction groove portion 36a, second circumferential direction seal portions 37b that are mounted into the two sets of second circumferential direction groove portions 36b, and a pipe axial direction seal portion (not shown) that is mounted into the pipe axial direction groove portion 36c.

Then, the pipe axial direction seal portions of both second seal members 37 come into contact with each other in a sealed state (watertight state) from a pipe radial direction between the divided surfaces of both connection flange portions 30C. The first circumferential direction seal portions 37a and the second circumferential direction seal portions 37b of both second seal members 37 come into contact with the outer peripheral surfaces 1a and 2c of both fluid pipes 1 and 2 at both pipe support portions 30d and 30e of the collar 30 in a sealed state along the pipe circumferential direction.

As shown in FIGS. 2 and 5, in the first disengagement blocking part 4, a semicircular ring-shaped disengagement blocking wall portion 41 protruding to the inner side in the pipe radial direction to a position where it can come into contact with head portions 23A of the plurality of T-head bolts 23 of the first fasteners 25 from the pipe axis direction is integrally formed on the inner peripheral surface 30f between the pipe support portions 30d and 30e of each of the divided collar cases 30A and 30B and at a location shifted to the other end side in the pipe axis direction. In the present embodiment, the disengagement blocking wall portion 41 is formed at a boundary location between the peripheral wall portion 30a and the tapered side wall portion 30c in the inner peripheral surface 30f of each of the divided collar cases 30A and 30B.

The side surface facing the head portions 23A of the plurality of T-head bolts 23 in the pipe axis direction, of both side surfaces of the disengagement blocking wall portion 41, is configured as a contact surface 41a that blocks a relative disengagement movement beyond a certain level between the socket portion 2A and the collar 30 in a disengaged state due to the contact with the head portions 23A of the T-head bolts 23.

The plurality of metal T-head bolts 23 that are disposed at predetermined intervals in the pipe circumferential direction are also configured to serve as contact members 45 that are fixed to the socket portion 2A side, and a contact surface 23a, which is a flat top surface of the head portion 23A of each T-head bolt 23, is configured as a contact surface 45a of the contact member 45.

Each of the contact surface 41a of the disengagement blocking wall portion 41 and the contact surface 45a of the contact member 45 that is configured with the contact surface 23a of the head portion 23A of each T-head bolt 23 is formed on an orthogonal plane orthogonal to the pipe axis.

Then, when a disengagement force caused by an earthquake, uneven settlement, or the like acts on the fitting connection part 20 between the spigot portion 1A of the fluid pipe 1 on one side and the socket portion 2A of the fluid pipe 2 on the other side, as shown in FIG. 3, the contact surface 41a of the disengagement blocking wall portion 41 in the collar 30 and the contact surface 45a of the contact member 45, which is configured with the contact surface 23a of the head portion 23A of each T-head bolt 23 fixed to the socket portion 2A side, come into contact with each other in a surface contact manner from the pipe axis direction, so that further disengagement movement between the socket portion 2A of the fluid pipe 2 and the collar 30 is blocked. At this time, since the contact surface 41a of the disengagement blocking wall portion 41 in the collar 30 and the contact surface 45a of the contact member 45 are formed on the orthogonal planes orthogonal to the pipe axis, the contact surface 41a of the disengagement blocking wall portion 41 and the contact surface 45a of the contact member 45 are in a surface contact state along the orthogonal direction. In this way, the disengagement force can be reliably taken, so that the disengagement blocking effect can be improved. Further, since a pushing-opening force of a divided joint portion, which acts on the divided collar cases 30A and 30B of the collar 30 at the time of contact, is not generated, a decrease in the sealing performance at the divided joint portions of the divided collar cases 30A and 30B can be suppressed.

In the present embodiment, as shown in FIG. 2, an initial assembled state is a state where the tip of the T-head bolt 23 of the fitting connection part 20 is in contact with the inner surface of the side wall portion 30b on one end side of the collar 30. Further, as shown in FIG. 3, a maximum disengagement movement state is a state where the contact surface 23a of the head portion 23A of the T-head bolt 23 is in contact with the contact surface 41a of the disengagement blocking wall portion 41 in the collar 30.

In this way, as shown in FIG. 2, an interval from the contact surface 23a of the head portion 23A of the T-head bolt 23 to the contact surface 41a of the disengagement blocking wall portion 41 in the initial assembled state is a maximum disengagement movement distance L. In the maximum disengagement movement state, as shown in FIG. 3, a disengaged state is created where the connection between the spigot portion 1A of the fluid pipe 1 on one side and the socket portion 2A of the fluid pipe 2 on the other side is released.

As shown in FIGS. 1 and 2, the second disengagement blocking part 5 is configured with an earthquake-proof reinforcement metal fitting 50 having a divided structure. The earthquake-proof reinforcement metal fitting 50 is provided with a pair of divided clamping members 51 made of metal, which is divided into two in the pipe circumferential direction and clamps and is fixed to the spigot portion 1A of the fluid pipes 1 on one side so as to be detachable from the pipe radial direction. The pair of divided clamping members 51 firmly clamps and is fixed to the spigot portion 1A of the fluid pipe 1 by fastening and connecting flange portions 51A provided at both end portions thereof in the pipe circumferential direction with a third fastener 47 such as a bolt 48 and a nut 49.

The connection part 52 of the earthquake-proof reinforcement metal fitting 50 includes an annular engagement protrusion 53 formed to protrude from the outer peripheral surface of the pipe support portion 30d on one end side of the collar 30, and an engagement recess 54 that is detachably engaged with the engagement protrusion 53 from the outer side in the pipe radial direction. The engagement recess 54 is formed to be open inward in the pipe radial direction at a location which integrally protrudes along the pipe axis direction from an intermediate portion in the pipe circumferential direction of each divided clamping member 51.

In a case where the earthquake-proof reinforcement metal fitting 50 is mounted to the spigot portion 1A of the fluid pipe 1, as shown in FIGS. 1 and 2, the engagement recess 54 integrally formed in each of both divided clamping members 51 is engaged with the engagement protrusion 53 of the pipe support portion 30d on one end side of the collar 30 from the outer side in the pipe radial direction, and in this state, the flange portions 51A of both divided clamping members 51 are fastened and connected to each other with the bolt 48 and nut 49 of the third fastener 47.

As shown in FIG. 1, gap restricting bolts 58 that come into contact with the outer peripheral surface 1a of the spigot portion 1A from the pipe radial direction are screwed to a plurality of locations in the pipe circumferential direction of the pipe support portion 30d on one end side of the collar 30. An annular gap between the inner peripheral surface of the pipe support portion 30d on one end side and the outer peripheral surface 1a of the spigot portion 1A is restricted to be constant by the screwing of the plurality of gap restricting bolts 58.

Then, when a strong disengagement force is produced due to an earthquake, uneven settlement, or the like acts, the engagement recess 54 of the earthquake-proof reinforcement metal fitting 50 and the engagement protrusion 53 of the pipe support portion 30d on one end side of the collar 30 are engaged with each other from the pipe axis direction. When a stronger force acts in the disengagement direction in this engaged state, the pipe support portion 30d on one end side of the collar 30 is deformed to the pipe axis side, which might create a possibility that the engagement between the engagement recess 54 of the earthquake-proof reinforcement metal fitting 50 and the engagement protrusion 53 of the collar 30 may be released. However, in the present embodiment, due to the plurality of gap restricting bolts 58, it is possible to restrain the pipe support portion 30d on one end side of the collar 30 from being deformed to the pipe axis side, and it is possible to firmly maintain the engaged state between the engagement recess 54 of the earthquake-proof reinforcement metal fitting 50 and the engagement protrusion 53 of the collar 30.

As shown in FIGS. 2 and 5, the retaining part 55 of the earthquake-proof reinforcement metal fitting 50 includes a claw receiving portion 56 that is formed on the inner peripheral surface of the divided clamping member 51 and is open inward in the radial direction, and a claw member 57 that is accommodated in the claw receiving portion 56 so as to be movable inward in the pipe radial direction. A plurality of rows of sharp and tapered blade portions extending along the pipe circumferential direction and capable of biting into the outer peripheral surface 1a of the spigot portion 1A are formed on the inner surface of the claw member 57.

The outer surface of the claw member 57 and the ceiling surface of the claw receiving portion 56 are formed as inclined surfaces such that the claw member 57 performs biting by being moved to the inner side in the radial direction according to the relative disengagement movement in the pipe axis direction between the claw receiving portion 56 of each of both divided clamping members 51 and the claw member 57 accommodated in the claw receiving portion 56 in a state of biting into the outer peripheral surface 1a of the spigot portion 1A.

Then, when a disengagement force caused by an earthquake, uneven settlement, or the like acts on the fitting connection part 20 between the spigot portion 1A of the fluid pipe 1 on one side and the socket portion 2A of the fluid pipe 2 on the other side, since the connection part 52 of the earthquake-proof reinforcement metal fitting 50 having a divided structure and provided at the spigot portion 1A is fixedly connected to the pipe support portion 30d on one end side of the collar 30 between the spigot portion 1A of the fluid pipe 1 on one side and the collar 30, the connection between the collar 30 and the earthquake-proof reinforcement metal fitting 50 is firmly maintained. Further, the claw member 57 of the retaining part 55 of the earthquake-proof reinforcement metal fitting 50 bites into the outer peripheral surface 1a of the spigot portion 1A according to the disengagement movement of the spigot portion 1A with respect to the pipe support portion 30d on one end side of the collar 30, thereby to increase falling-off resistance. Therefore, as a whole, the spigot portion 1A of the fluid pipe 1 on one side and the pipe support portion 30d on one end side of the collar 30 are integrally and firmly fixed and connected to each other through the earthquake-proof reinforcement metal fitting 50.

In this way, as shown in FIG. 3, even if the spigot portion 1A and the socket portion 2A are disengaged from each other, each of the falling-out movement of the socket portion 2A with respect to the pipe support portion 30e on the other end side of the collar 30 and the falling-out movement of the spigot portion 1A with respect to the pipe support portion 30d on one end side of the collar 30 can be firmly blocked.

Moreover, two locations spaced apart from each other in the pipe axis direction at the spigot portion 1A of the fluid pipe 1 are supported by the pipe support portion 30d on one end side of the collar 30 and the retaining part 55 of the earthquake-proof reinforcement metal fitting 50. Therefore, as shown in FIG. 3, in the disengaged state where the connection of the spigot portion 1A and the socket portion 2A is released, bending of the spigot portion 1A and the pipe support portion 30d on one end side of the collar 30 can be suppressed.

As shown in FIGS. 2 and 3, the tilt restricting part 9 includes a tilt restricting element 90 that is externally mounted to the spigot portion 1A in a state where the spigot portion 1A of the fluid pipe 1 on one side and the socket portion 2A of the fluid pipe 2 on the other side are fitted and connected to each other and the disengaged state, and a fixing connection part 91 that fixedly connects the tilt restricting element 90 to the socket portion 2A. The tilt restricting element 90 has a tilt restricting tubular portion 90b formed with a tilt restricting surface 90a having an inner diameter slightly larger than the outer diameter of the spigot portion 1A, and a connection flange portion 90c that integrally protrudes outward in the radial direction from the outer peripheral surface of the tilt restricting tubular portion 90b.

As shown in FIG. 3, when the spigot portion 1A is tilted with respect to the pipe support portion 30d on one end side of the collar 30 in the disengaged state where the connection of the spigot portion 1A and the socket portion 2A is released, the tilt restricting surface 90a of the tilt restricting element 90 comes into contact with the outer surface of the end portion of the spigot portion 1A to restrict further tilt.

Figure 6:
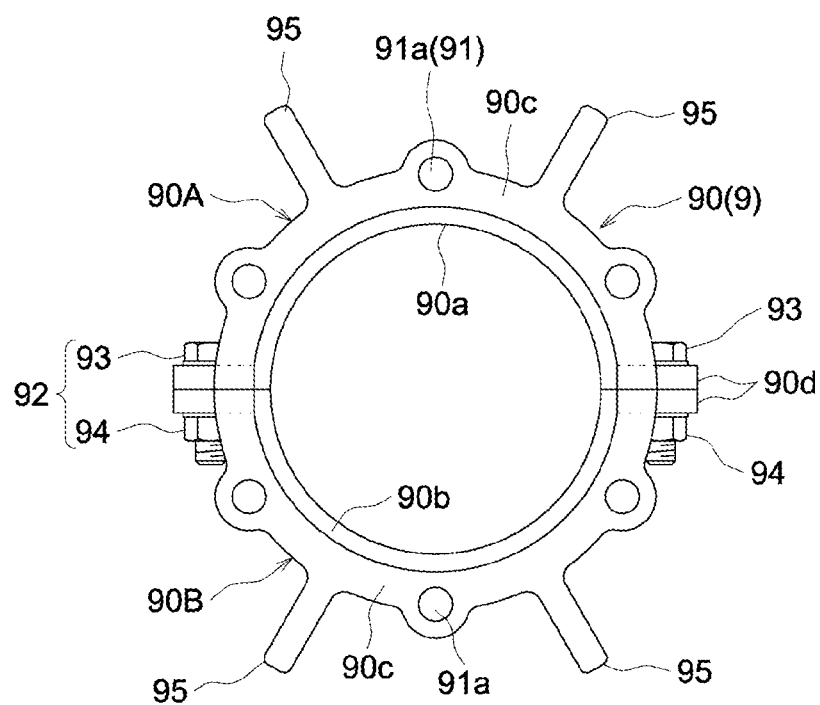
FIG. 6 is a front view of a tilt restricting part of a first example.

As shown in FIG. 6, the tilt restricting element 90 is divided into two in the pipe circumferential direction and is composed of a pair of semicircular ring-shaped divided tilt restricting members 90A and 90B made of metal, which is externally mounted to the spigot portion 1A so as to be detachable from the pipe radial direction. The pair of divided tilt restricting members 90A and 90B is configured in an annular shape along the outer peripheral surface 1a of the spigot portion 1A by fastening and connecting connection pieces 90d provided at both end portions thereof in the pipe circumferential direction with a fourth fastener 92 such as a bolt 93 and a nut 94.

As shown in FIGS. 2 and 6, a tilt restricting protrusion portion 95, which restricts further tilt of the spigot portion 1A by coming into contact with the inner surface of the collar 30 according to the tilt of the spigot portion 1A with respect to the pipe support portion 30d on one end side of the collar 30 in the disengaged state where the connection of the spigot portion 1A and the socket portion 2A is released, is provided at the connection flange portion 90c of each of the divided tilt restricting members 90A and 90B. The tilt restricting protrusion portion 95 is provided at one location or a plurality of locations of each of the connection flange portions 90c. In the present embodiment, the tilt restricting protrusion portions 95 are formed to protrude to the outer side in the pipe radial direction from two locations in the circumferential direction of each of the connection flange portions 90c.

As shown in FIG. 2, an engagement protrusion 90e, which is engaged with a tapered gap formed between the tapered inner peripheral surface 22c of the push ring 22 and the outer peripheral surface 1a of the spigot portion 1A from the pipe axis direction, is provided to protrude from the tilt restricting tubular portion 90b of each of the divided tilt restricting members 90A and 90B. As shown in FIG. 3, the engagement of the engagement protrusion 90e of each of the divided tilt restricting members 90A and 90B with the tapered inner peripheral surface 22c of the push ring 22 is maintained even in the disengaged state where the connection of the spigot portion 1A and the socket portion 2A is released. Due to the engagement of the engagement protrusion 90e of each of the divided tilt restricting members 90A and 90B with the tapered inner peripheral surface 22c of the push ring 22 in the disengaged state, the tilt of the spigot portion 1A with respect to the pipe support portion 30d on one end side of the collar 30 is restricted.

As shown in FIGS. 2 and 6, the fixing connection part 91 of the tilt restricting part 9 is configured with the first fastener 25 of the fitting connection part 20. Specifically, a bolt insertion hole 91a through which the tip portion of the T-head bolt 23 can be inserted is formed at a location corresponding to each T-head bolt 23 of the first fastener 25 in the connection flange portion 90c of each of the divided tilt restricting members 90A and 90B. A fixing connection nut 91b is screwed to the tip portion of the T-head bolt 23 inserted into each of the bolt insertion holes 91a of the divided tilt restricting members 90A and 90B. The tilt restricting element 90 is fixedly connected to the socket portion 2A by fastening the fixing connection nut 91b.

Then, as shown in FIG. 3, in the disengaged state where the connection of the spigot portion 1A and the socket portion 2A is released, a bending force is produced due to an earthquake, an unequal force caused by fluid pressure, or the like, which might lead to a case where the spigot portion 1A is tilted with respect to the pipe support portion 30d on one end side of the collar 30, as shown in FIG. 4. At this time, the outer surface of the end portion of the spigot portion 1A comes into contact with the tilt restricting surface 90a of the tilt restricting element 90, and a part of the tilt restricting protrusion portion 95 of the tilt restricting element 90 comes into contact with the inner surface of the collar 30. In this way, the bent state between the spigot portion 1A and the pipe support portion 30d on one end side of the collar 30 in the disengaged state is maintained within an appropriate range, and thus it is possible to suppress leakage of a fluid due to a local decrease in sealing performance in the circumferential direction of the seal part 35.

Further, in the first disengagement blocking part 4 of the first embodiment described above, the disengagement movement between the socket portion 2A and the collar 30 is blocked by the contact between the contact surface 41a of the disengagement blocking wall portion 41 provided in the collar 30 and the head portion 23A of each T-head bolt 23 fixed to the socket portion 2A side. However, there is no limitation to this configuration. For example, in the case of the collar 30 in which the disengagement blocking wall portion 41 is not provided, when the first disengagement blocking part 4 is described with reference to FIGS. 2 and 3, a thick disengagement blocking portion 42 that can come into contact with the tapered outer peripheral surface portion 2e in the outer peripheral surface 2c of the socket portion 2A from the pipe axis direction is formed on the other end side in the pipe axis direction in the inner surface between the pipe support portions 30d and 30e of the collar 30, in other words, at the side wall portion 30c on the other end side of the collar 30. A contact surface 42a of the disengagement blocking portion 42 is formed in a tapered shape having the same gradient as the tapered outer peripheral surface portion 2e in the outer peripheral surface 2c of the socket portion 2A.

In the first disengagement blocking part 4 described above, when a disengagement force due to an earthquake, uneven settlement, or the like acts on the fitting connection part 20 between the spigot portion 1A and the socket portion 2A, the contact surface 42a of the disengagement blocking portion 42 formed on the side wall portion 30c on the other end side of the collar 30 and the tapered outer peripheral surface portion 2e in the outer peripheral surface 2c of the socket portion 2A come into contact with each other, so that it is possible to block further disengagement movement between them. At this time, since the contact surface 42a of the disengagement blocking portion 42 is formed in a tapered shape having the same gradient as the tapered outer peripheral surface portion 2e in the outer peripheral surface 2c of the socket portion 2A, the contact surface 42a of the disengagement blocking portion 42 and the tapered outer peripheral surface portion 2e of the socket portion 2A come into contact with each other in a surface contact state, so that it is possible to firmly block the disengagement movement between the socket portion 2A and the collar 30.

Moreover, when the contact surface 42a of the disengagement blocking portion 42 comes into contact with the tapered outer peripheral surface portion 2e of the socket portion 2A, a force to push and open the divided surfaces of the collar 30 having a divided structure is generated. However, in the present invention, since the contact surface 42a of the disengagement blocking portion 42 is formed on the other end side in the pipe axis direction of the collar 30 between the pipe support portions 30d and 30e, the pushing-opening force is reduced by a shift allowance for the shift of the contact surface 42a of the disengagement blocking portion 42 from the pipe support portions 30d and 30e, so that it is possible to suppress the occurrence of fluid leakage due to a decrease in the sealing performance of the seal part 35 with the pushing-opening of the divided surface of the collar 30.

[Another Connection Structure of the Tilt Restricting Element 90 of the First Embodiment]

Figures 7A, 7B:
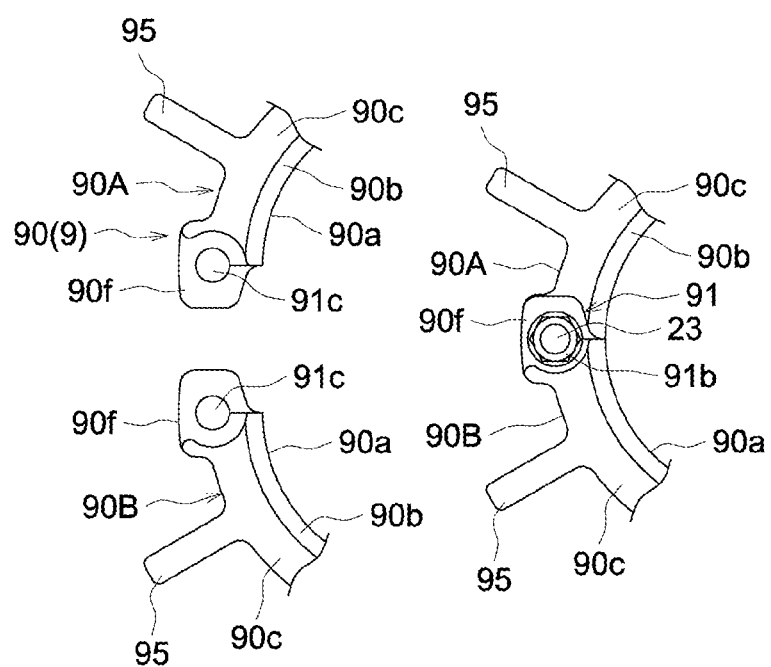
FIGS. 7(a) and 7(b) are front views of a main part showing another connection structure of the tilt restricting part of the first example.

In the first embodiment described above, as shown in FIG. 6, as a first example of the tilt restricting element 90, the connection pieces 90d provided at both end portions in the pipe circumferential direction of each of the divided tilt restricting members 90A and 90B are connected to each other by the fourth fastener 92 such as the bolt 93 and the nut 94. Instead of this connection structure of the tilt restricting element 90, another connection structure shown in FIGS. 7(a) and 7(b) may be adopted. In this other connection structure, second connection pieces 90f that can be overlapped and disposed from the pipe radial direction are integrally formed with both end portions in the pipe circumferential direction of each of the divided tilt restricting members 90A and 90B. A second bolt insertion hole 91c through which the tip portion of the T-head bolt 23 can be inserted is formed in each of the second connection pieces 90f of each set, which are overlapped and disposed. In this way, the divided tilt restricting members 90A and 90B can be connected in an annular shape by using the T-head bolt 23 and the fixing connection nut 91b configuring the fixing connection part 91 of the tilt restricting part 9.

[Second Example of the Tilt Restricting Element 90]

Figure 8:
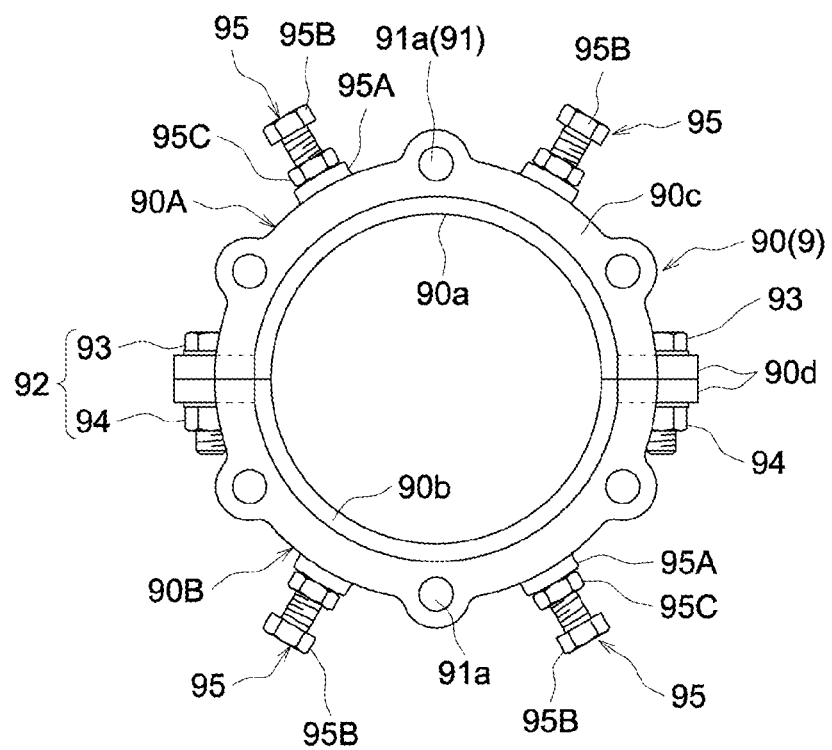
FIG. 8 is a front view of a tilt restricting part of a second example.

In a second example of the tilt restricting element 90 shown in FIG. 8, the tilt restricting protrusion portion 95 is configured such that the contact position thereof with the inner surface of the collar 30 can be changed in the pipe radial direction. Specifically, the tilt restricting protrusion portion 95 includes a female screw portion 95A formed at each of two locations in the circumferential direction of each of the divided tilt restricting members 90A and 90B, a tilt restricting bolt 95B which is screwed to the female screw portion 95A from the pipe radial direction, and a lock nut 95C for fixing the tilt restricting bolt 95B whose contact position in the pipe radial direction is adjusted. The contact position with the inner surface of the collar 30 is changed in the pipe radial direction by a screwing operation of the tilt restricting bolt 95B.

Then, when the tilt restricting element 90 having a divided structure, of the tilt restricting part 9, is externally mounted to the spigot portion 1A, there is a scene in which the socket portion 2A and the spigot portion 1A are bent at the fitting connection part 20. Even in this case, the contact position of the tilt restricting bolt 95B can be changed in the pipe radial direction according to the actually measured distance between the tip of the tilt restricting bolt 95B of the tilt restricting element 90 and a protrusion contact location on the inner peripheral surface 30f of the collar 30. In this way, even in the scene in which the socket portion 2A and the spigot portion 1A are bent at the fitting connection part 20, it is possible to efficiently and reliably perform the externally assembling work of the tilt restricting part 9 to the spigot portion 1A. Moreover, when a bending force is produced due to an earthquake, an unequal force caused by fluid pressure, or the like in the disengaged state, it is possible to accurately bring the tilt restricting bolt 95B of the tilt restricting element 90 into contact with the inner surface of the collar 30.

Second Embodiment

Figure 9:
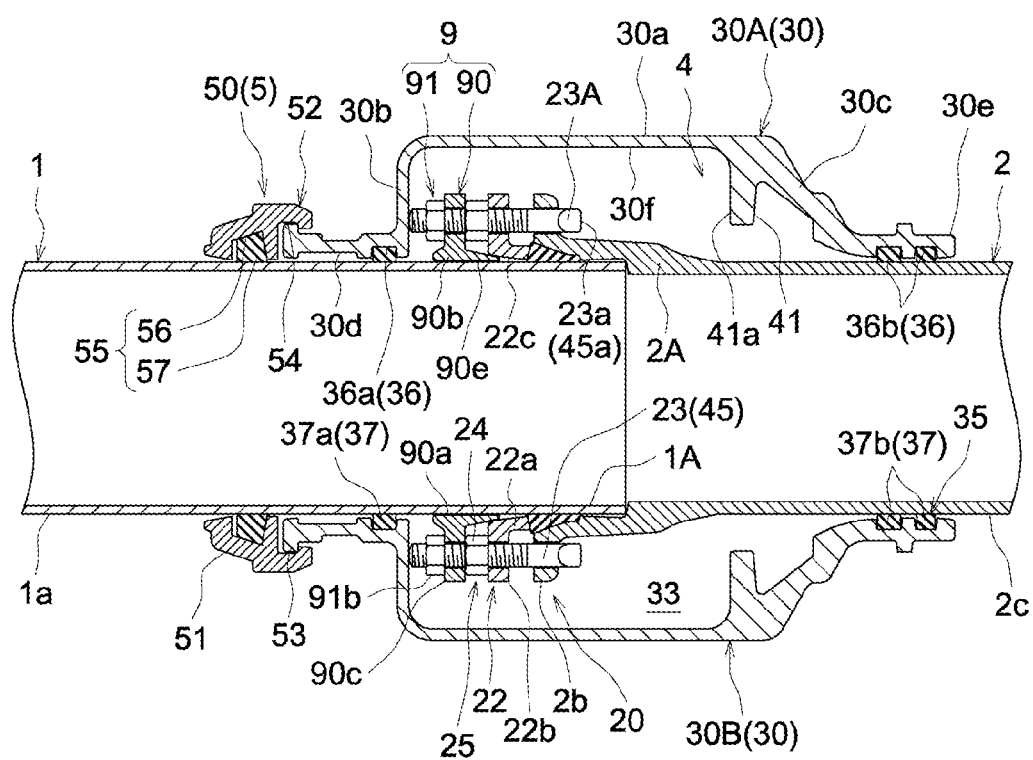
FIG. 9 is an overall sectional view at the time of assembly, showing a second embodiment of the disengagement prevention structure for a pipe connecting portion.
Figure 10:
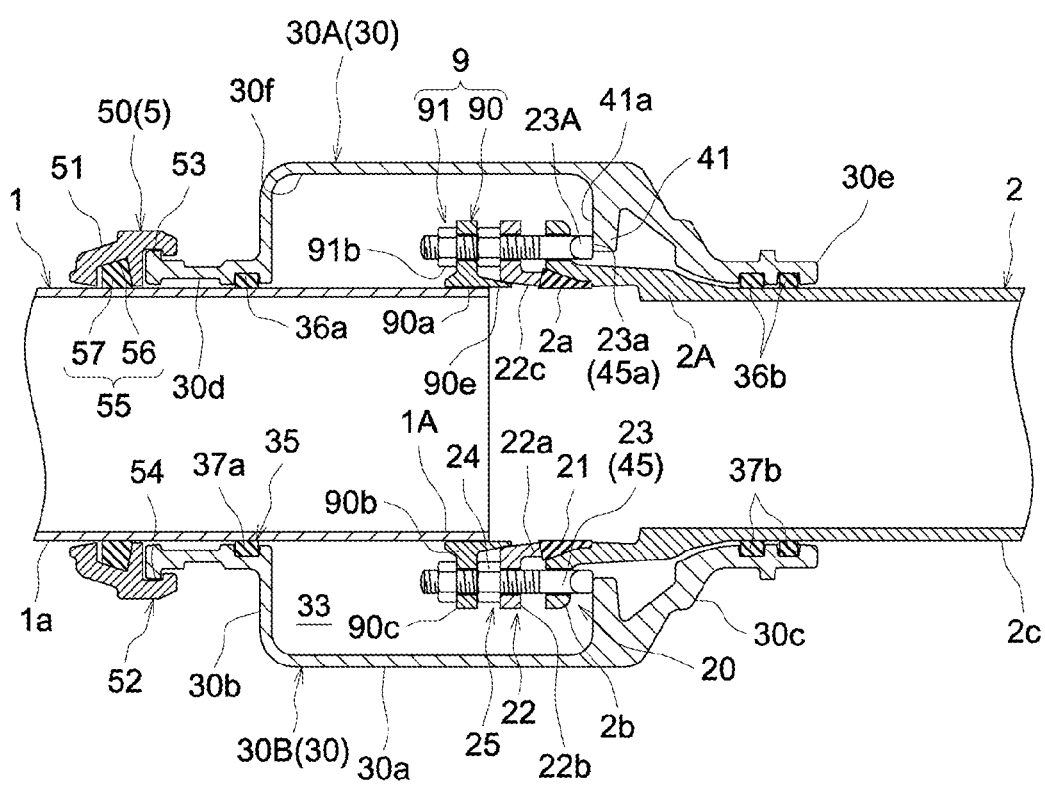
FIG. 10 is an overall vertical sectional view at the time of disengagement.

In a second embodiment of the disengagement prevention structure for a pipe connecting portion shown in FIGS. 9 and 10, the tilt restricting protrusion portion 95 of the tilt restricting element 90 described in the first embodiment described above is omitted. Therefore, as shown in FIG. 10, in the disengaged state where the connection of the spigot portion 1A and the socket portion 2A is released, a bending force is produced due to an earthquake, an unequal force caused by fluid pressure, or the like acts, and thus the spigot portion 1A is tilted with respect to the pipe support portion 30d on one end side of the collar 30. At this time, the outer surface of the end portion of the spigot portion 1A comes into contact with the tilt restricting surface 90a of the tilt restricting element 90. In this way, the bent state between the spigot portion 1A and the pipe support portion 30d on one end side of the collar 30 in the disengaged state is maintained within an appropriate range, and thus it is possible to suppress leakage of a fluid due to a local decrease in the sealing performance in the circumferential direction of the seal part 35.

Further, since the other configurations are the same as the configurations described in the first embodiment, the same configuration parts are denoted by the same reference numerals as those in the first embodiment and the description thereof is omitted.

Third Embodiment

Figure 11:
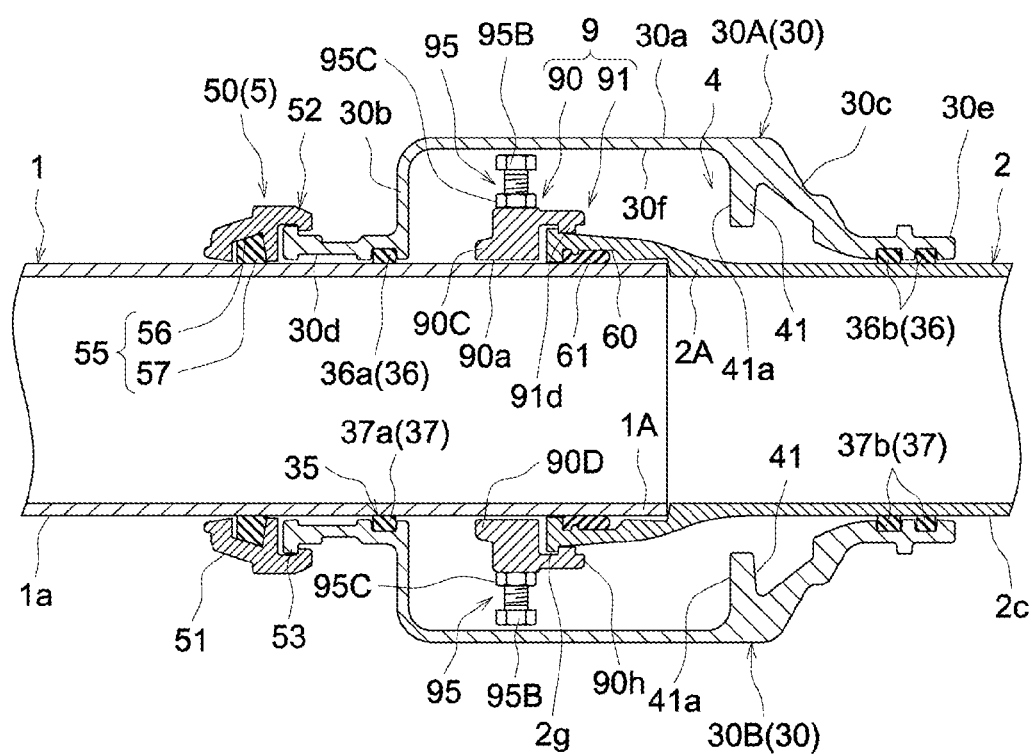
FIG. 11 is an overall sectional view at the time of assembly, showing a third embodiment of the disengagement prevention structure for a pipe connecting portion.
Figure 12:
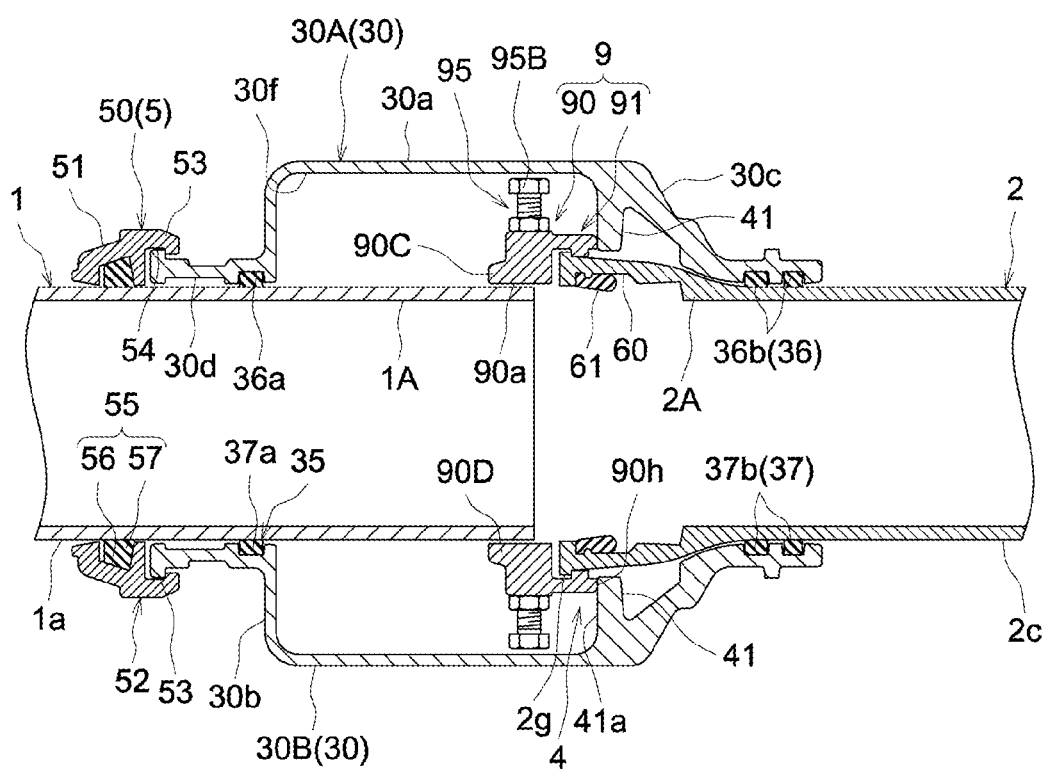
FIG. 12 is an overall sectional view at the time of disengagement.
Figure 13:
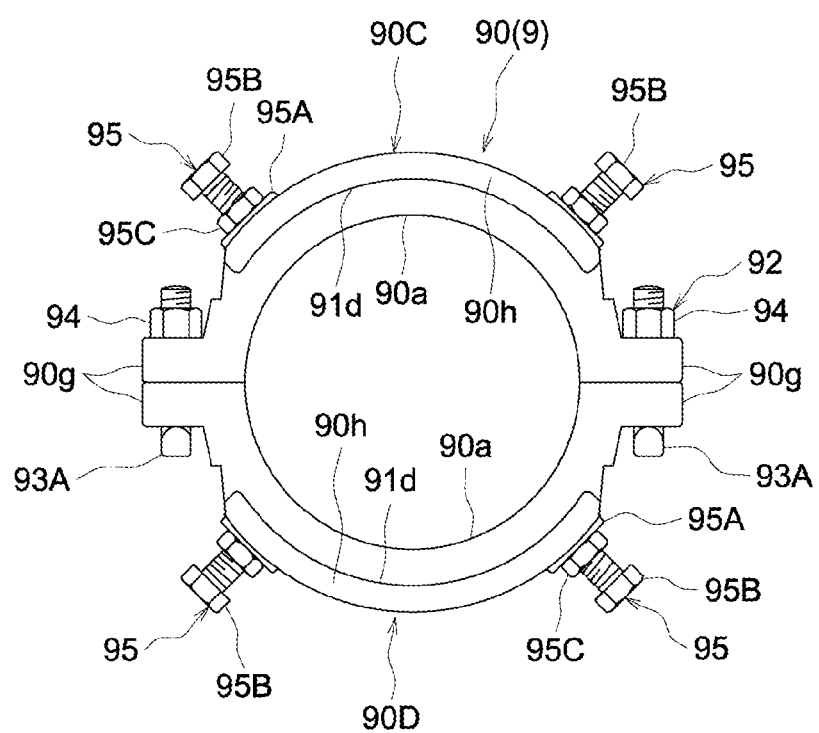
FIG. 13 is a front view of a tilt restricting part of a third example.

In a third embodiment of the disengagement prevention structure for a pipe connecting portion shown in FIGS. 11 to 13, the fitting connection part 20 between the spigot portion 1A of the fluid pipe 1 on one side and the socket portion 2A of the fluid pipe 2 on the other side is configured with a T-shaped mechanical joint. The T-shaped mechanical joint has a configuration in which a third seal member 61 such as a rubber ring, which is compressed in a sealed state (watertight state) against the outer peripheral surface 1a of the spigot portion 1A fitted and connected to the socket portion 2A, is mounted into an annular seal holding groove 60 which is formed on the inner peripheral surface of the socket portion 2A and is open inward in the radial direction.

The tilt restricting part 9, which restricts the tilt of the spigot portion 1A with respect to the pipe support portion 30d on one end side of the collar 30 in the disengaged state where the connection of the socket portion 2A and the spigot portion 1A is released, is provided within the collar 30 having a divided structure and surrounding the fitting connection part 20 in a sealed state.

As shown in FIGS. 11 and 12, the tilt restricting part 9 includes the tilt restricting element 90 that is externally mounted to the spigot portion 1A in a state where the spigot portion 1A of the fluid pipe 1 on one side and the socket portion 2A of the fluid pipe 2 on the other side are fitted and connected to each other and the disengaged state, and the fixing connection part 91 that fixedly connects the tilt restricting element 90 to the socket portion 2A. The tilt restricting element 90 has the tilt restricting surface 90a having an inner diameter slightly larger than the outer diameter of the spigot portion 1A. As shown in FIG. 12, when the spigot portion 1A is tilted with respect to the pipe support portion 30d on one end side of the collar 30 in the disengaged state where the connection of the spigot portion 1A and the socket portion 2A is released, the tilt restricting surface 90a comes into contact the outer surface of the end portion of the spigot portion 1A to restrict further tilt.

As shown in FIG. 13, the tilt restricting element 90 is divided into two in the pipe circumferential direction and includes a pair of semicircular ring-shaped second divided tilt restricting members 90C and 90D which is made of metal and externally mounted to the spigot portion 1A so as to be detachable from the pipe radial direction. The pair of second divided tilt restricting members 90C and 90D is configured in an annular shape along the outer peripheral surface 1a of the spigot portion 1A by fastening and connecting third connection pieces 90g provided at both end portions thereof in the pipe circumferential direction with the fourth fastener 92 such as a T-head bolt 93A and the nut 94.

As shown in FIGS. 11 and 13, the tilt restricting protrusion portion 95, which restricts further tilt of the spigot portion 1A by coming into contact with the inner surface of the collar 30 according to the tilt of the spigot portion 1A with respect to the pipe support portion 30d on one end side of the collar 30 in the disengaged state where the connection between the spigot portion 1A and the socket portion 2A is released, is provided at each of the second divided tilt restricting members 90C and 90D. The tilt restricting protrusion portion 95 is provided at one location or a plurality of locations of each of the divided tilt restricting members 90A and 90B. In the present embodiment, the tilt restricting protrusion portions 95 are formed so as to protrude to the outer side in the pipe radial direction from two locations in the circumferential direction of each of the divided tilt restricting members 90A and 90B.

The tilt restricting protrusion portion 95 is configured such that the contact position with respect to the inner surface of the collar 30 can be changed in the pipe radial direction. Specifically, the tilt restricting protrusion portion 95 includes a female screw portion 95A formed at each of two locations in the circumferential direction of each of the divided tilt restricting members 90A and 90B, a tilt restricting bolt 95B which is screwed to the female screw portion 95A from the pipe radial direction, and a lock nut 95C for fixing the tilt restricting bolt 95B whose contact position in the pipe radial direction is adjusted. The contact position with the inner surface of the collar 30 is changed in the pipe radial direction by a screwing operation of the tilt restricting bolt 95B.

The fixing connection part 91 is composed of a second engagement protrusion 91d provided at the tilt restricting element 90 in a state where it can be engaged and disengaged from the outer side in the pipe radial direction with respect to an annular protrusion 2g formed at the end portion of the outer peripheral surface 2c of the socket portion 2A, and the fourth fastener 92 that fastens and fixes the third connection pieces 90g of the second divided tilt restricting members 90C and 90D to the spigot portion 1A in a clamping state, in a state where the second engagement protrusion 91d of the tilt restricting element 90 is engaged with the annular protrusion 2g of the socket portion 2A.

As shown in FIGS. 11 and 12, the first disengagement blocking part 4, which allows a relative disengagement movement to the disengaged state where the connection between the socket portion 2A and the spigot portion 1A is released, and blocks, by contact, a relative disengagement movement beyond a certain level between the socket portion 2A and the collar 30 in the disengaged state, is provided at a location where the collar 30 and the socket portion 2A side of the fluid pipe 2 on the other side face each other in the pipe axis direction.

As shown in FIGS. 11 and 12, in the first disengagement blocking part 4, the semicircular ring-shaped disengagement blocking wall portion 41 protruding to the inner side in the pipe radial direction to a position where it can come into contact with a contact portion 90h formed on the other end side of each of the second divided tilt restricting members 90C and 90D from the pipe axis direction is integrally formed with the inner peripheral surface 30f between the pipe support portions 30d and 30e of each of the divided collar cases 30A and 30B and at a location shifted to the other end side in the pipe axis direction. In the present embodiment, the disengagement blocking wall portion 41 is formed at a boundary location between the peripheral wall portion 30a and the tapered side wall portion 30c in the inner peripheral surface 30f of each of the divided collar cases 30A and 30B.

The side surface facing the contact portion 90h of each of the second divided tilt restricting members 90C and 90D in the pipe axis direction, of both side surfaces of the disengagement blocking wall portion 41, is configured as the contact surface 41a that blocks a relative disengagement movement beyond a certain level between the socket portion 2A and the collar 30 in the disengaged state by the contact with the contact portion 90h of each of the second divided tilt restricting members 90C and 90D.

Further, since the other configurations are the same as the configurations described in the first embodiment, the same configuration parts are denoted by the same reference numerals as those in the first embodiment and the description thereof is omitted.

Fourth Embodiment

Figure 14:
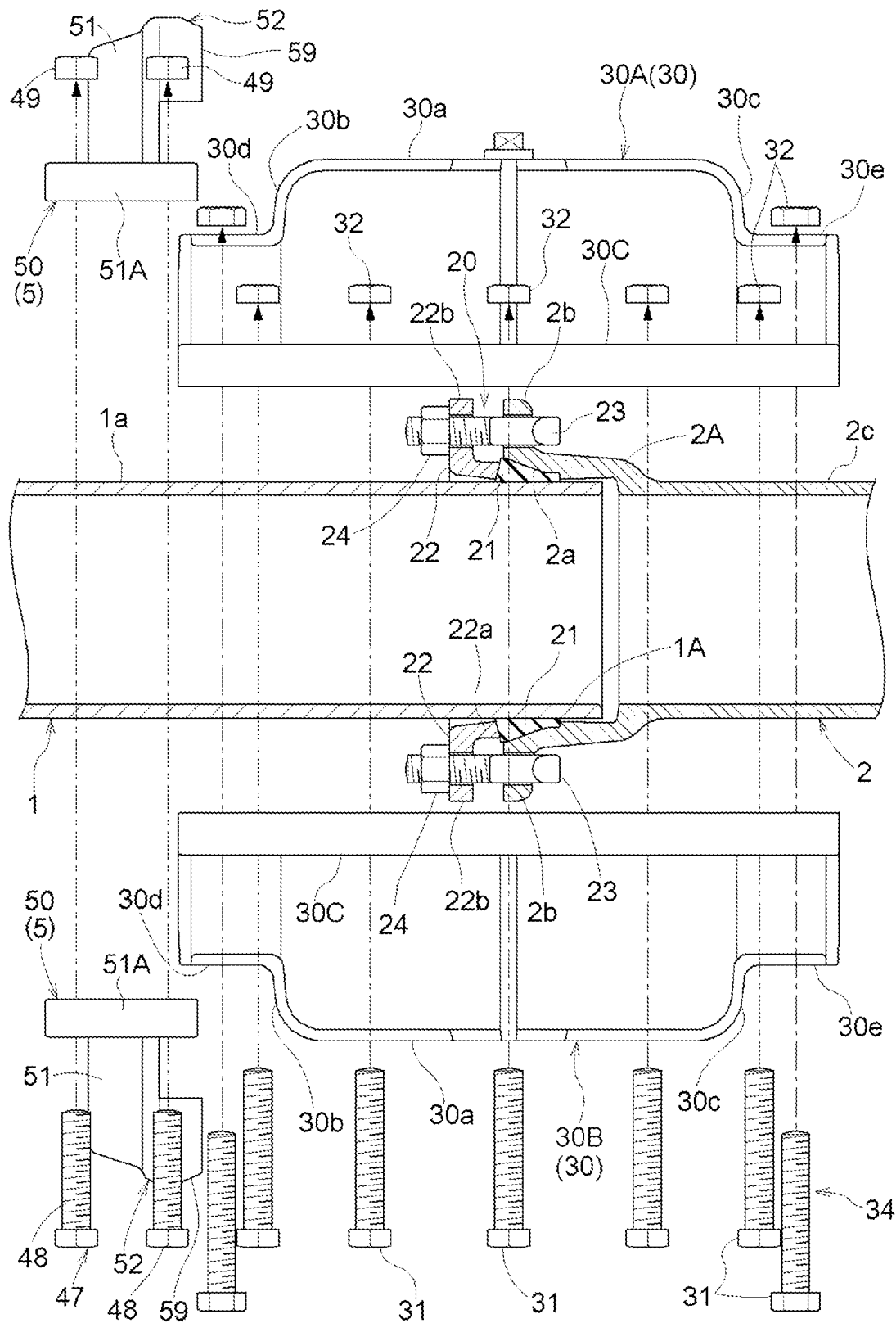
FIG. 14 is a partial sectional view in a disassembled state, showing a fourth embodiment of the disengagement prevention structure for a pipe connecting portion.
Figure 15:
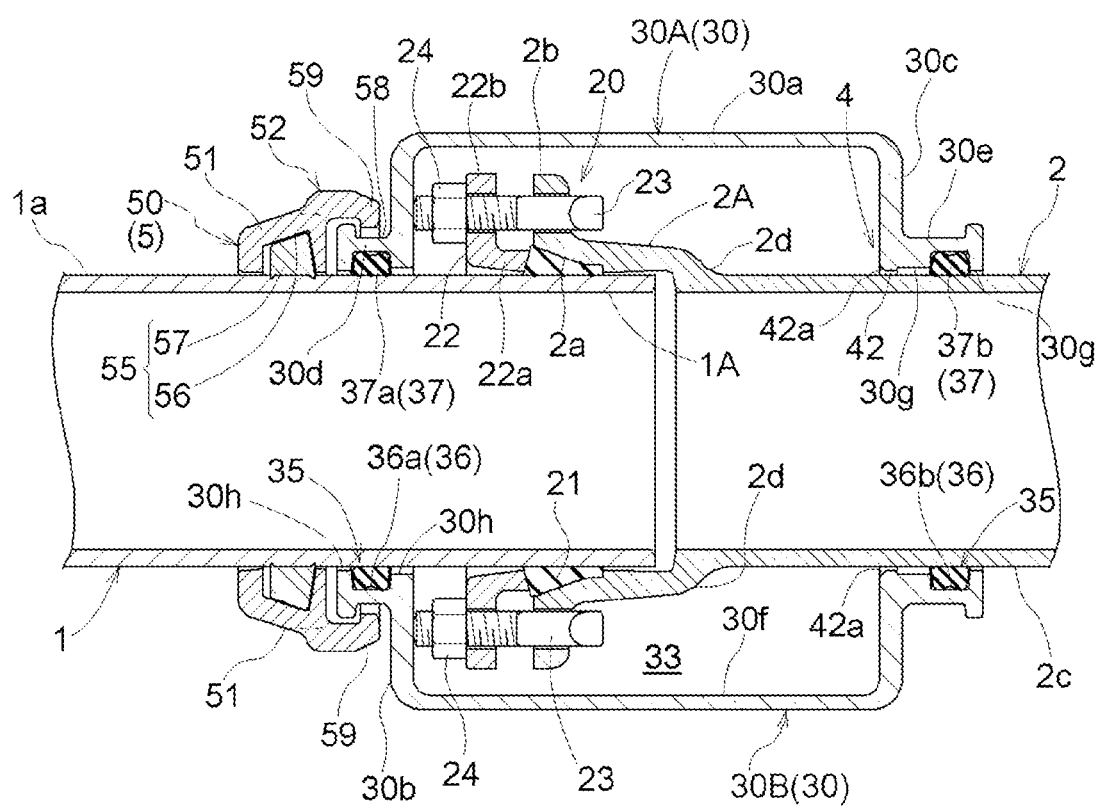
FIG. 15 is an overall sectional view at the time of assembly.

FIGS. 14 and 15 show a disengagement prevention structure for a pipe connecting portion which is used in a fluid transportation pipe system. In the disengagement prevention structure for a pipe connecting portion, the spigot portion 1A of the fluid pipe 1 which is an example of the pipe portion on one side and the socket portion 2A of the fluid pipe 2 which is an example of the pipe portion on the other side are connected to each other by the fitting connection part 20, and the collar 30 having a divided structure and surrounding the fitting connection part 20 in a sealed state is externally mounted over both fluid pipes 1 and 2. The fitting connection part 20 is configured with a K-shaped mechanical joint, as in the first embodiment.

Figure 17:
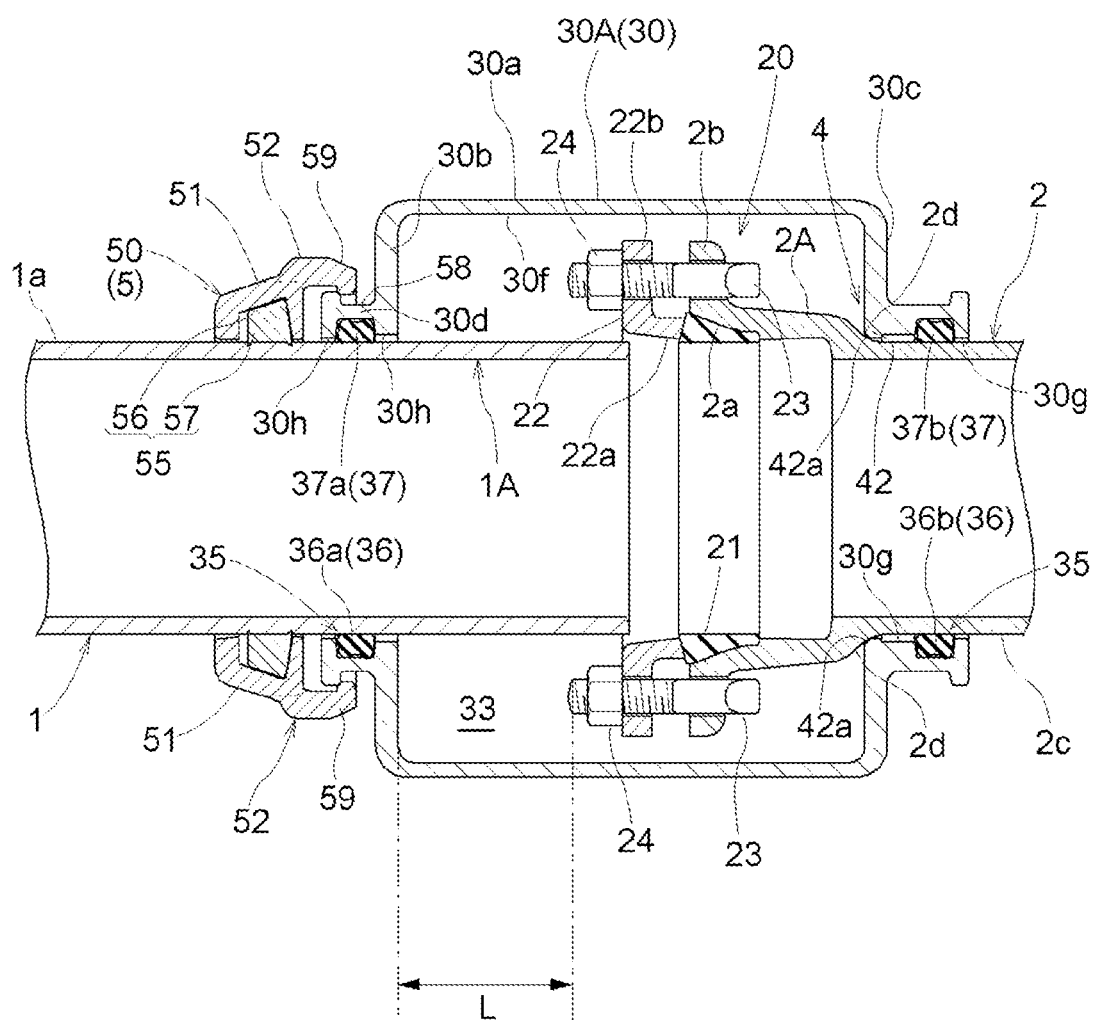
FIG. 17 is an overall sectional view at the time of disengagement.

As shown in FIGS. 15 and 17, the first disengagement blocking part 4, which allows a relative disengagement movement to the disengaged state where the connection between the socket portion 2A and the spigot portion 1A are released, and blocks, by contact, a relative disengagement movement beyond a certain level between the socket portion 2A and the collar 30 in the disengaged state, is provided at a location where the collar 30 and the socket portion 2A side of the fluid pipe 2 on the other side face each other in the pipe axis direction.

As shown in FIGS. 15 and 17, the second disengagement blocking part 5 having a divided structure is provided at the spigot portion 1A of the fluid pipes 1 on one side. The second disengagement blocking part 5 includes the connection part 52 which is fixedly connected to the pipe support portion 30d on one end side in the pipe axis direction of the collar 30, and the retaining part 55 in which falling-off resistance between the retaining part 55 and the outer peripheral surface 1a of the spigot portion 1A increases according to the disengagement movement of the spigot portion 1A with respect to the pipe support portion 30d on one end side of the collar 30.

Figure 16:
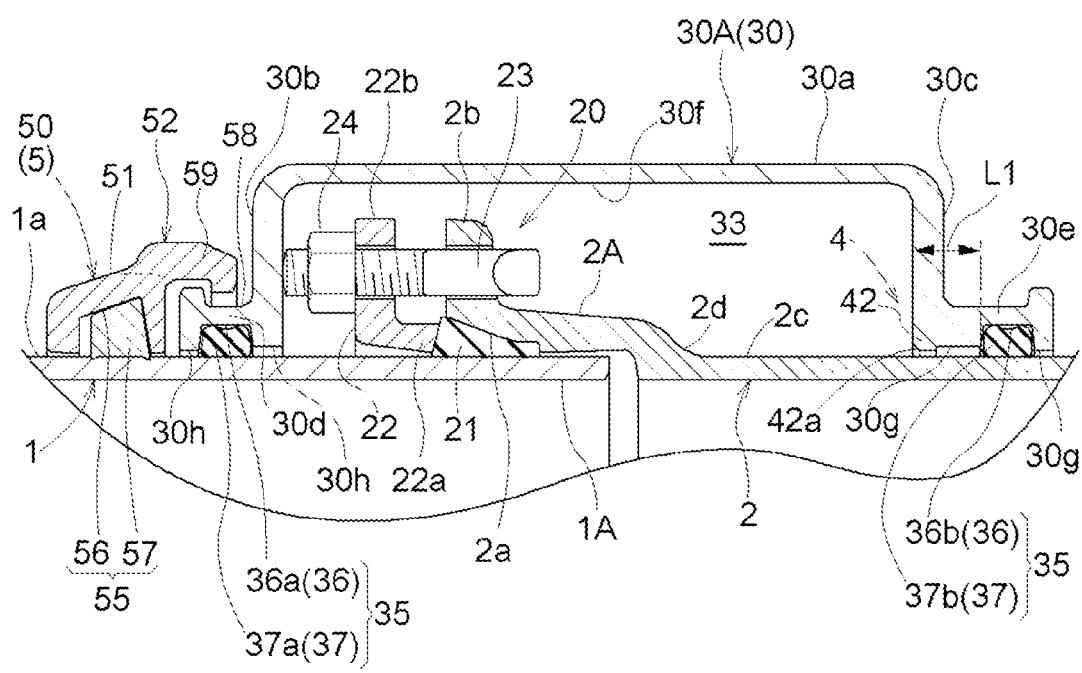
FIG. 16 is an enlarged sectional view of a main part at the time of assembly.

As shown in FIGS. 15 and 16, the collar 30 is composed of the divided collar cases 30A and 30B made of cast iron and having a two-divided structure, which can be externally mounted over both fluid pipes 1 and 2 in a state of surrounding the fitting connection part 20 between both fluid pipes 1 and 2. The collar 30 includes, as main configurations, the peripheral wall portion 30a having a cylindrical shape having a diameter larger than that of the socket portion 2A, the annular side wall portions 30b and 30c integrally extending inward in the radial direction from both ends in the pipe axis direction of the peripheral wall portion 30a, and the tubular pipe support portions 30d and 30e integrally extending outward along the pipe axis direction from the end portions on the inner diameter side of each of the side wall portions 30b and 30c.

As shown in FIG. 14, the connection flange portions 30C which are fixedly connected to each other through the second fastener 34 such as the bolt 31 and the nut 32 are integrally formed with both end portions in the pipe circumferential direction of each of the divided collar cases 30A and 30B of the collar 30. The seal part 35 (refer to FIG. 15), which seals, in a watertight manner, the surrounding space 33 that is formed between the inner peripheral surface 30*f* (refer to FIG. 16) of the collar 30 and the outer peripheral surfaces 1*a* and 2*c* of both fluid pipes 1 and 2 including the fitting connection part 20 with respect to the outside, is provided on the divided surfaces of the divided collar cases 30A and 30B.

As shown in FIGS. 15 and 16, the seal part 35 is configured by mounting the second seal member 37 such as an annular gasket into the annular seal holding groove 36 formed in each of the divided surfaces of the divided collar cases 30A and 30B. Both second seal members 37 come into contact with each other in a watertight state from the pipe radial direction at both end portions in the pipe circumferential direction of each of the divided collar cases 30A and 30B, and come into contact with the outer peripheral surfaces 1*a* and 2*c* of the fluid pipes 1 and 2 in a watertight state along the pipe circumferential direction at both pipe support portions 30*d* and 30*e* of the collar 30.

As shown in FIGS. 15 to 17, the first disengagement blocking part 4 is configured by forming the disengagement blocking portion 42 provided with the annular contact surface 42*a* capable of coming contact with the outer peripheral surface 2*c* of the socket portion 2A from the pipe axis direction, on the inner peripheral surface side of the pipe support portion 30*e* on the other end side in the pipe axis direction of the collar 30 and at a location shifted toward the center side in the pipe axis direction of the collar 30 with respect to the second circumferential direction groove portion 36*b* of the seal holding groove 36 formed on the inner peripheral surface of the pipe support portion 30*e* and the second circumferential direction seal portion 37*b* of the second seal member 37 mounted into the second circumferential direction groove portion 36*b*.

The disengagement blocking portion 42 is formed to have a diameter smaller than the inner diameter of each of partition walls 30*g* which are located on both sides in the pipe axis direction of the second circumferential direction groove portion 36*b* on the inner peripheral surface of the pipe support portion 30*e* on the other end side. In other words, the inner peripheral surface of the disengagement blocking portion 42 is formed to protrude to the inner side in the radial direction with respect to the inner peripheral surface of each of the partition walls 30*g* which are located on both sides of the second circumferential direction groove portion 36*b*. The disengagement blocking portion 42 is formed integrally with the partition wall 30*g* on one side, and is configured in a reinforcing structure in which the thickness in the pipe axis direction from the contact surface 42*a* of the disengagement blocking portion 42 to the second circumferential direction groove portion 36*b* of the seal holding groove 36 is also large.

Further, the contact surface 42*a* of the disengagement blocking portion 42 is formed at the same or substantially the same inclination angle as the inclination angle of a tapered contact portion 2*d* of the outer peripheral surface 2*c* of the socket portion 2A.

When a disengagement force due to an earthquake, uneven settlement, or the like acts on the fitting connection part 20 between the spigot portion 1A of the fluid pipe 1 on one side and the socket portion 2A of the fluid pipe 2 on the other side, the contact surface 42*a* of the disengagement blocking portion 42 comes into contact with the tapered contact portion 2*d* of the outer peripheral surface 2*c* of the socket portion 2A, both of which are provided to face each other in the pipe axis direction between the socket portion 2A of the fluid pipe 2 on the other side and the pipe support portion 30*e* on the other end side of the collar 30, thereby to block, by contact, a relative disengagement movement beyond a certain level between the socket portion 2A of the fluid pipe 2 on the other side and the pipe support portion 30*e* on the other end side of the collar 30.

Therefore, in the present embodiment, as shown in FIGS. 15 and 16, an initial assembled state is a state where the tip of the T-head bolt 23 of the fitting connection part 20 is in contact with the inner surface of the side wall portion 30*b* on one end side of the collar 30. Further, as shown in FIG. 17, a maximum disengagement movement state is a state where the contact surface 42*a* of the disengagement blocking portion 42 formed at the pipe support portion 30*e* on the other end side of the collar 30 is in contact with the tapered contact portion 2*d* of the outer peripheral surface 2*c* of the socket portion 2A.

In this way, as shown in FIG. 17, in the maximum disengagement movement state where an interval from the tip position of the T-head bolt 23 in the initial assembled state or the inner surface of the side wall portion 30*b* on one end side of the collar 30 to the tip position of the T-head bolt 23 which is in the maximum disengagement movement state is a maximum disengagement movement distance L. In the maximum disengagement movement state, the disengaged state is created, in which the connection between the spigot portion 1A of the fluid pipe 1 on one side and the socket portion 2A of the fluid pipe 2 on the other side is released.

Then, as described above, when a disengagement force due to an earthquake, uneven settlement, or the like acts on the fitting connection part 20 between the spigot portion 1A and the socket portion 2A, thereby to bring the contact surface 42*a* of the disengagement blocking portion 42 formed on the inner peripheral surface side of the pipe support portion 30*e* on the other end side of the collar 30 to come into contact with the tapered contact portion 2*d* of the outer peripheral surface 2*c* of the socket portion 2A, a force to push and open the divided surface of the collar 30 having a divided structure is generated. However, in the present invention, since the disengagement blocking portion 42 of the collar 30 is formed at a location shifted toward the center side in the pipe axis direction of the collar 30 with respect to the second circumferential direction groove portion 36*b* of the seal holding groove 36, a pushing-opening force is reduced by the amount corresponding to the shift allowance, and it is possible to suppress the occurrence of fluid leakage due to a decrease in the sealing performance (a decrease in surface pressure) of the seal part 35 according to the pushing-opening of the divided surfaces of the collar 30.

Further, as shown in FIG. 16, a distance L1 from the contact surface 42*a*, which is the contact position of the disengagement blocking portion 42, to the second circumferential direction groove portion 36*b* of the seal holding groove 36 formed on the inner peripheral surface of the pipe support portion 30*e* on the other end side is configured to be larger than the thickness dimension in the pipe axis direction in the partition wall 30*h* on the inner side that is the center side in the pipe axis direction of the collar 30, of the partition walls 30*h* on both sides in the pipe axis direction in the first circumferential direction groove portion 36*a* of the seal holding groove 36 formed on the inner peripheral surface of the pipe support portion 30*d* on one end side.

As shown in FIG. 16, since a thickness dimension corresponding to the distance L1 from the contact surface 42*a* of the disengagement blocking portion 42 of the collar 30 to the second circumferential direction groove portion 36*b* of the seal part 35 is configured to be larger than the thickness dimension in the pipe axis direction of the partition wall 30*h* of the first circumferential direction groove portion 36a in the pipe support portion 30d on one end side of the collar 30, the disengagement blocking portion 42 that comes into contact with the outer peripheral surface 2c of the socket portion 2A can be solidly configured.

As shown in FIGS. 15 and 16, the second disengagement blocking part 5 is configured with the earthquake-proof reinforcement metal fitting 50 having a divided structure. The connection part 52 of the earthquake-proof reinforcement metal fitting 50 is composed of an annular engagement recess 58 which is formed on the outer peripheral surface of the pipe support portion 30d on one end side and is open to the outer side in the radial direction, and an engagement protrusion 59 that is disengageably engaged with the engagement recess 58 from the outer side in the pipe radial direction. The engagement protrusions 59 are integrally formed to protrude along the pipe axis direction from a plurality of locations in the pipe circumferential direction of the divided clamping members 51.

In a case where the earthquake-proof reinforcement metal fitting 50 is mounted to the spigot portion 1A of the fluid pipe 1, as shown in FIGS. 14 and 15, the engagement protrusion 59 integrally formed with each of the divided clamping members 51 is engaged with the engagement recess 58 of the pipe support portion 30d on one end side from the outer side in the pipe radial direction, and in this state, the flange portions 51A of the divided clamping members 51 are fastened and connected to each other with the third fastener 47 such as the bolt 48 and the nut 49.

Further, the retaining part 55 of the earthquake-proof reinforcement metal fitting 50 is configured in the same structure as the retaining part 55 described in the first embodiment. Therefore, the same configuration parts are denoted by the same reference numerals as those of the first embodiment, and the description thereof is omitted.

Fifth Embodiment

Figure 18A:
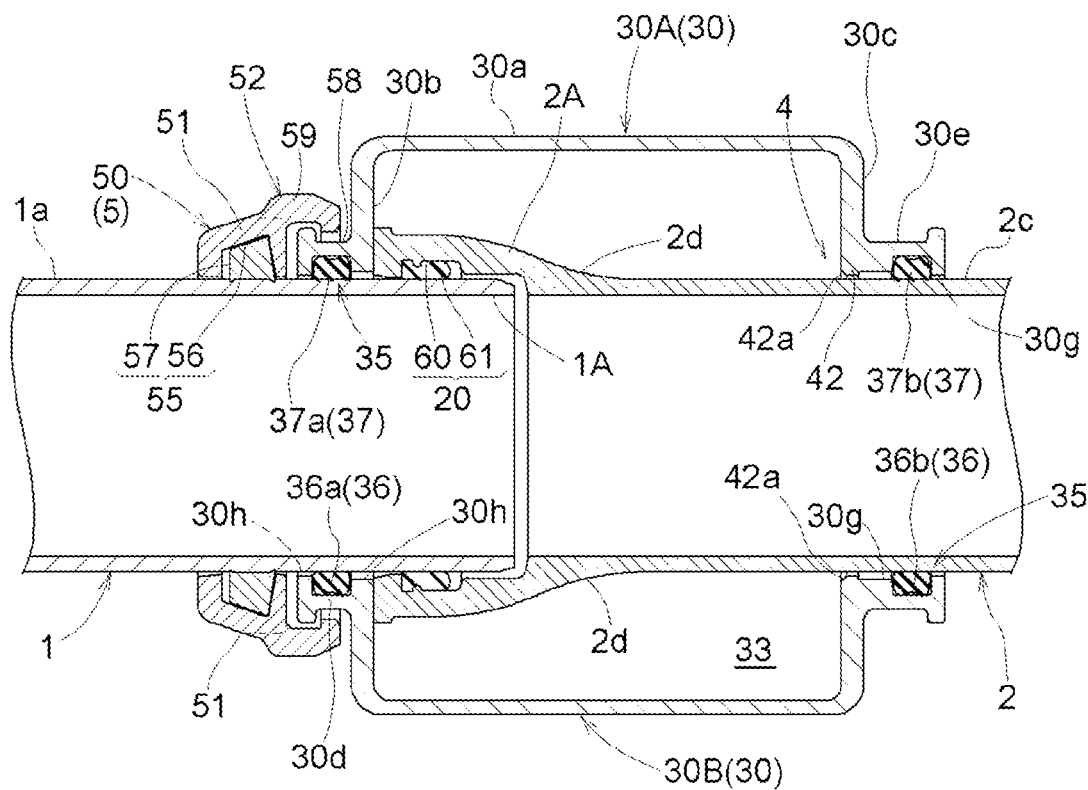
FIG. 18(a) is an overall sectional view at the time of assembly and FIG. 18(b) is an overall sectional view at the time of disengagement, showing a fifth embodiment of the disengagement prevention structure for a pipe connecting portion.
Figure 18B:
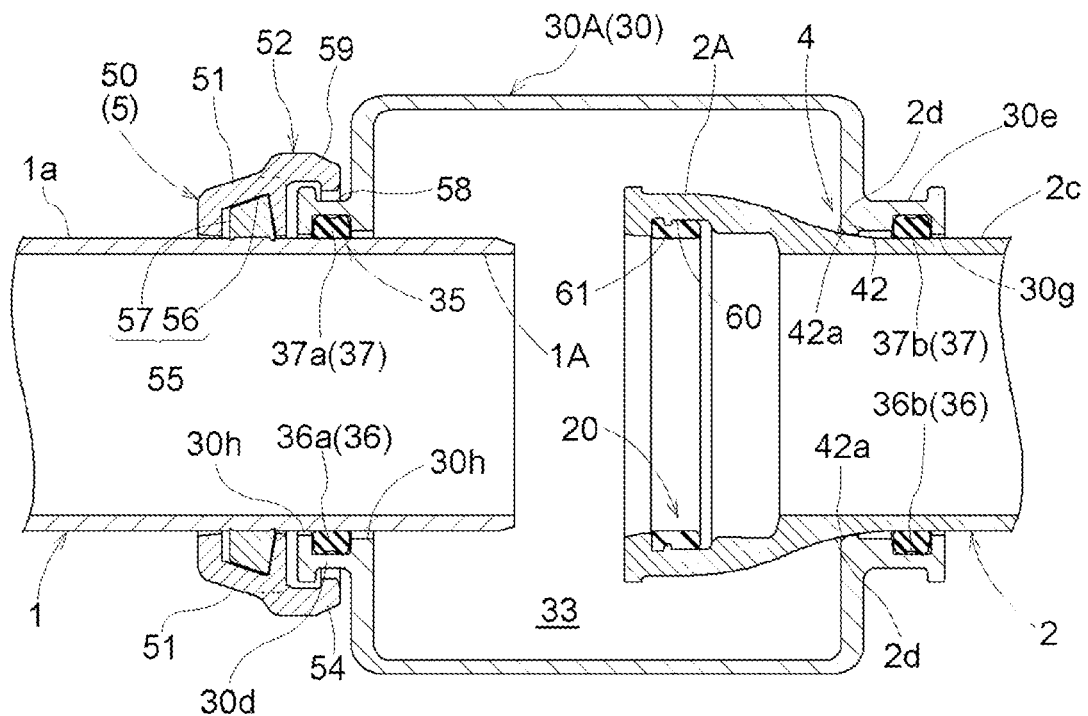

In a disengagement prevention structure for a pipe connecting portion shown in FIGS. 18(a) and 18(b), the fitting connection part 20 between the spigot portion 1A of the fluid pipe 1 on one side and the socket portion 2A of the fluid pipe 2 on the other side is configured with a T-shaped mechanical joint as in the third embodiment. Since the other configurations are the same as the configurations described in the fourth embodiment, the same configuration parts are denoted by the same reference numerals as those in the fourth embodiment, and the description thereof is omitted.

Sixth Embodiment

Figure 19:
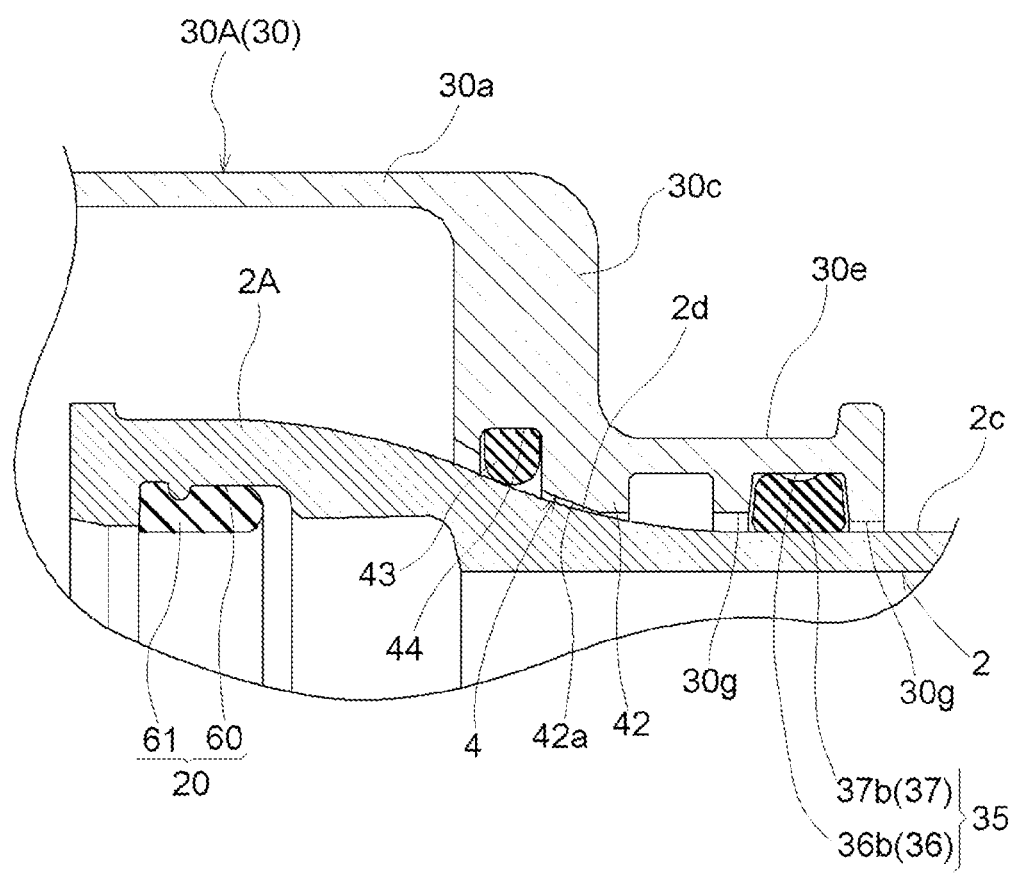
FIG. 19 is an enlarged view of a main part, showing a sixth embodiment of the disengagement prevention structure for a connecting portion.

In a disengagement prevention structure for a pipe connecting portion shown in FIG. 19, the fitting connection part 20 between the spigot portion 1A of the fluid pipe 1 on one side and the socket portion 2A of the fluid pipe 2 on the other side is configured with e T-shaped mechanical joint. In the disengagement prevention structure for a pipe connecting portion, an improvement of the first disengagement blocking part 4 that blocks, by contact, a relative disengagement movement beyond a certain level between the socket portion 2A of the fluid pipe 2 on the other side and the collar 30 is shown. Also in the present embodiment, the disengagement blocking portion 42 provided with the annular contact surface 42a which can come into contact with the tapered contact portion 2d of the outer peripheral surface 2c of the socket portion 2A from the pipe axis direction is formed on the inner peripheral surface side of the pipe support portion 30e on the other end side in the pipe axis direction of the collar 30 and at a location shifted toward the center side in the pipe axis direction of the collar 30 with respect to the second circumferential direction groove portion 36b of the seal holding groove 36 formed on the inner peripheral surface of the pipe support portion 30e and the second circumferential direction seal portion 37b of the second seal member 37 mounted into the second circumferential direction groove portion 36b.

An annular elastic seal material 43 that seals a gap between the inner peripheral surface of the pipe support portion 30e and the outer peripheral surface 2c of the socket portion 2A in a state where the contact surface 42a of the disengagement blocking portion 42 is in contact with the tapered contact portion 2d of the outer peripheral surface 2c of the socket portion 2A is provided on the inner peripheral surface of the pipe support portion 30e on the other end side of the collar 30 and at a location shifted toward the center side in the pipe axis direction of the collar 30 with respect to the disengagement blocking portion 42.

The contact surface 42a of the disengagement blocking portion 42 and a second seal holding groove 44 for holding the elastic seal material 43 are formed on the inner peripheral surface of the side wall portion 30c on the other end side of the collar 30, and the thickness in the pipe axis direction of the side wall portion 30c on the other end side is configured to be larger than the thickness in the pipe axis direction of the side wall portion 30b on one end side of the collar 30 (refer to FIG. 15 of the fourth embodiment and FIGS. 18(a) and 18(b) of the fifth embodiment).

When a disengagement force due to an earthquake, uneven settlement, or the like acts on the fitting connection part 20 between the spigot portion 1A of the fluid pipe 1 on one side and the socket portion 2A of the fluid pipe 2 on the other side, the contact surface 42a of the disengagement blocking portion 42 formed on the inner peripheral surface side of the pipe support portion 30e on the other end side of the collar 30 comes into contact with the tapered contact portion 2d of the outer peripheral surface 2c of the socket portion 2A to block further disengagement movement between them. At this time, a coating protective layer such as powder coating which is formed on the outer peripheral surface 2c of the socket portion 2A, with which the contact surface 42a of the disengagement blocking portion 42 comes into contact, is damaged. However, since the elastic seal material 43 provided at the location shifted toward the center side in the pipe axis direction of the collar 30 with respect to the contact surface 42a of the disengagement blocking portion 42 seals a gap between the collar 30 and the outer peripheral surface 2c of the socket portion 2A, a fluid does not flow into a damaged portion of the coating protective layer, as a result of which the progress of corrosion of the socket portion 2A at the damaged portion of the coating protective layer can be suppressed.

Further, since the other configurations are the same as the configurations described in the fifth embodiment, the same configuration parts are denoted by the same reference numerals as those in the fifth embodiment and the description thereof is omitted.

Seventh Embodiment

Figure 20A:
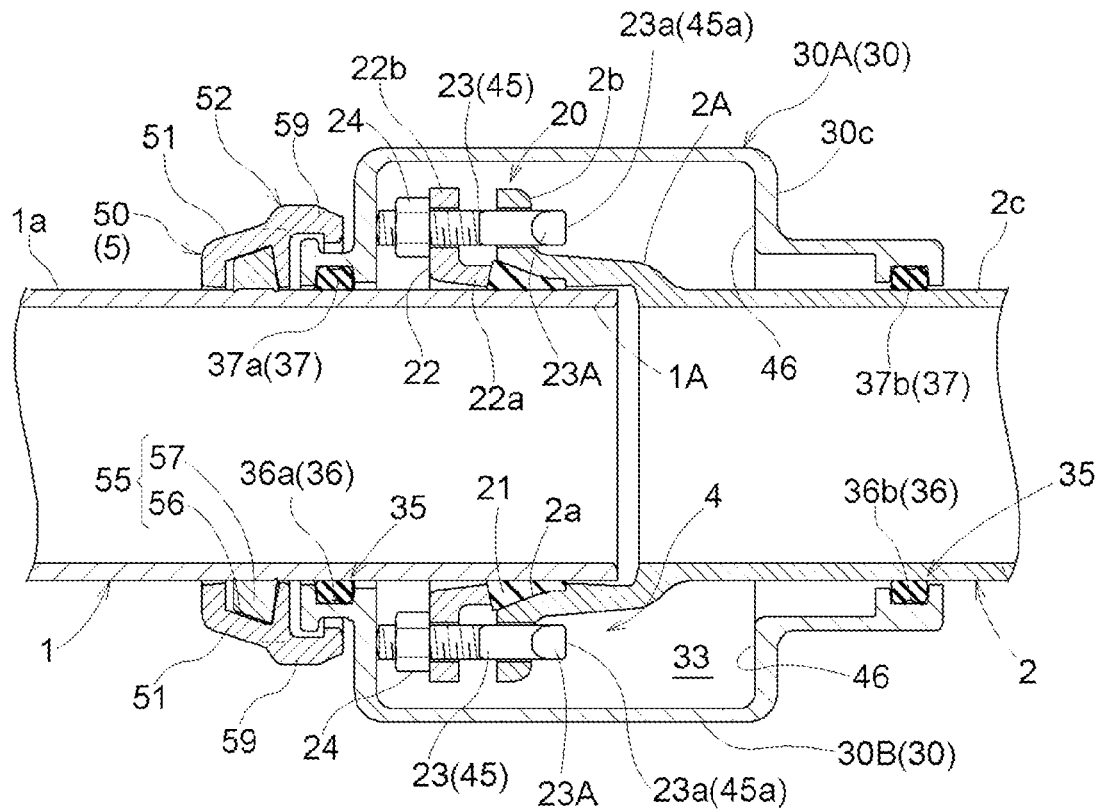
FIG. 20(a) is an overall sectional view at the time of assembly and FIG. 20(b) is an overall sectional view at the time of disengagement, showing a seventh embodiment of the disengagement prevention structure for a pipe connecting portion.
Figure 20B:
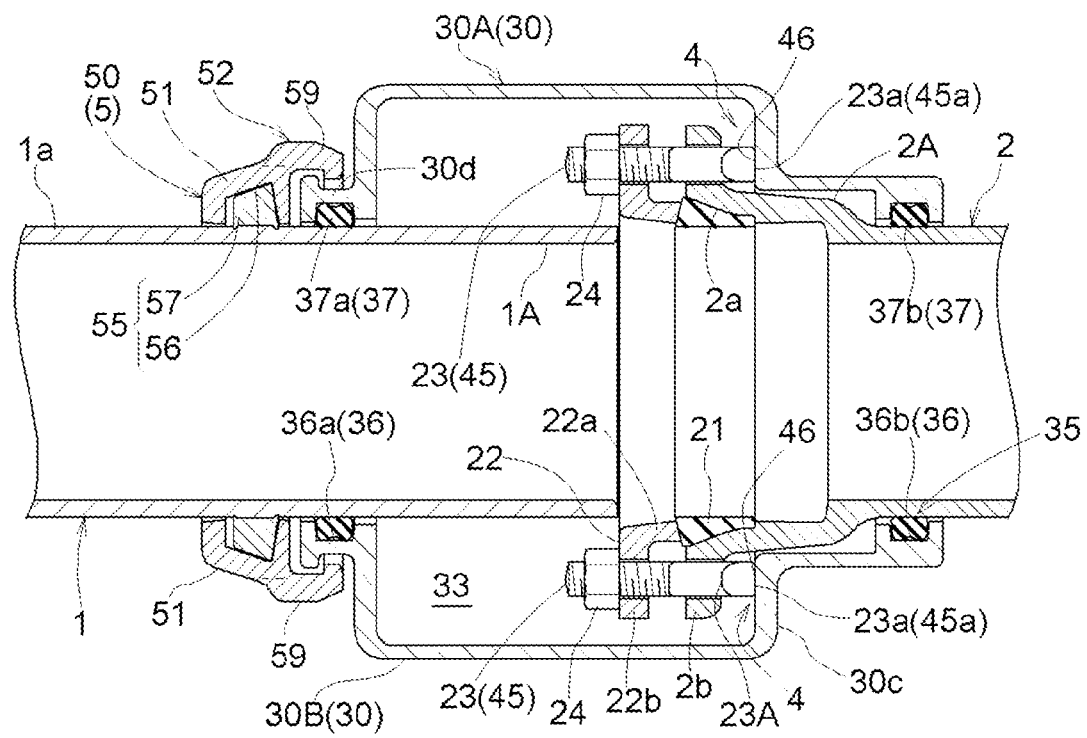

In a disengagement prevention structure for a pipe connecting portion shown in FIGS. 20(a) and 20(b), the fitting connection part 20 between the spigot portion 1A of the fluid pipe 1 on one side and the socket portion 2A of the fluid pipe 2 on the other side is configured with a K-shaped mechanical joint. In the disengagement prevention structure for a pipe connecting portion, an improvement of the first disengagement blocking part 4 that blocks, by contact, a relative disengagement movement beyond a certain level between the socket portion 2A of the fluid pipe 2 on the other side and the collar 30 is shown.

In the first disengagement blocking part 4 of the present embodiment, among the constituent members of the K-shaped mechanical joint forming the fitting connection part 20, a plurality of T-head bolts 23 made of metal and disposed at predetermined intervals in the pipe circumferential direction are also configured to serve as the contact members 45 which are fixed to the socket portion 2A side. The contact surface 23a, which is a flat top surface of the head portion 23A of each T-head bolt 23, is configured as the contact surface 45a of the contact member 45.

Further, the inner surface portion facing the head portion 23A of each T-head bolt 23 in the pipe axis direction, of the inner surface of the side wall portion 30c on the other end side in the pipe axis direction of the collar 30, is configured as a contact surface 46. Each of the contact surface 46 formed on the inner surface of the side wall portion 30c and the contact surface 23a of the head portion 23A of each T-head bolt 23 is formed on an orthogonal plane orthogonal to the pipe axis.

When a disengagement force due to an earthquake, uneven settlement, or the like acts on the fitting connection part 20 between the spigot portion 1A of the fluid pipe 1 on one side and the socket portion 2A of the fluid pipe 2 on the other side, the contact surface 46 formed on the inner surface of the side wall portion 30c on the other end side of the collar 30 and the contact surface 45a of the head portion 23A of each T-head bolt 23 fixed to the socket portion 2A side come into contact with each other in a surface contact manner from the pipe axis direction, thereby to block further disengagement movement between the socket portion 2A of the fluid pipe 2 and the collar 30. Due to the surface contact between the contact surface 46 of the collar 30 and the contact surface 23a of each T-head bolt 23, the disengagement force can be reliably received to improve the disengagement blocking effect.

Further, since the other configurations are the same as the configurations described in the fourth embodiment, the same configuration parts are denoted by the same reference numerals as those in the fourth embodiment and the description thereof is omitted.

Figure 21A:
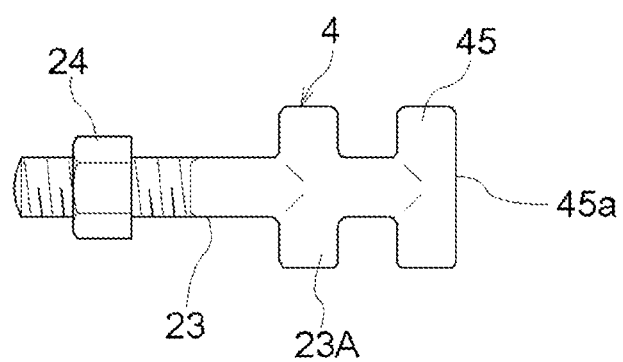
FIGS. 21(a) and 21(b) are enlarged views showing two other examples of a T-head bolt and a contact member which are used in the seventh embodiment.

Further, in the seventh embodiment described above, the flat contact surface 23a of the head portion 23A of each T-head bolt 23 is also configured to serve as the contact surface 45a of the contact member 45. However, as shown in FIG. 21(a), the contact member 45 having the contact surface 45a that can come into contact with the contact surface 46 of the side wall portion 30c of the collar 30 from the pipe axis direction may be integrally formed with the head portion 23A of each T-head bolt 23.

Also in this case, the contact surface 46 of the collar 30 and the contact surface 45a of the contact member 45 in each T-head bolt 23 on the socket portion 2A side are formed on the orthogonal planes orthogonal to the pipe axis. In this way, the contact surface 46 of the collar 30 and the contact surface 45a of the contact member 45 in each T-head bolt 23 come into contact with each other in a surface contact manner, so that the disengagement force can be reliably received to improve the disengagement blocking effect.

Figure 21B:
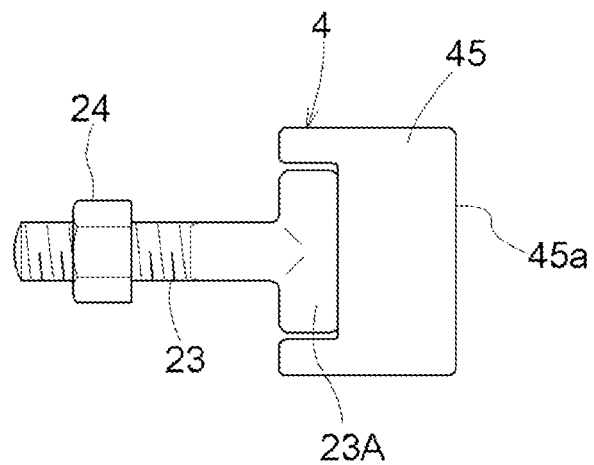

Further, as shown in FIG. 21(b), the contact member 45 having the contact surface 45a that can come into contact with the contact surface 46 of the side wall portion 30c of the collar 30 from the pipe axis direction may be fitted and fixed to the head portion 23A of each T-head bolt 23 as an attachment.

Also in this case, the contact surface 46 of the collar 30 and the contact surface 45a of a contact member 45B in each T-head bolt 23 on the socket portion 2A side are formed on the orthogonal planes orthogonal to the pipe axis. In this way, the contact surface 46 of the collar 30 and the contact surface 45a of the contact member 45B in each T-head bolt 23 come into contact with each other in a surface contact manner, so that the disengagement force can be reliably received to improve the disengagement blocking effect.

Eighth Embodiment

Figure 22A:
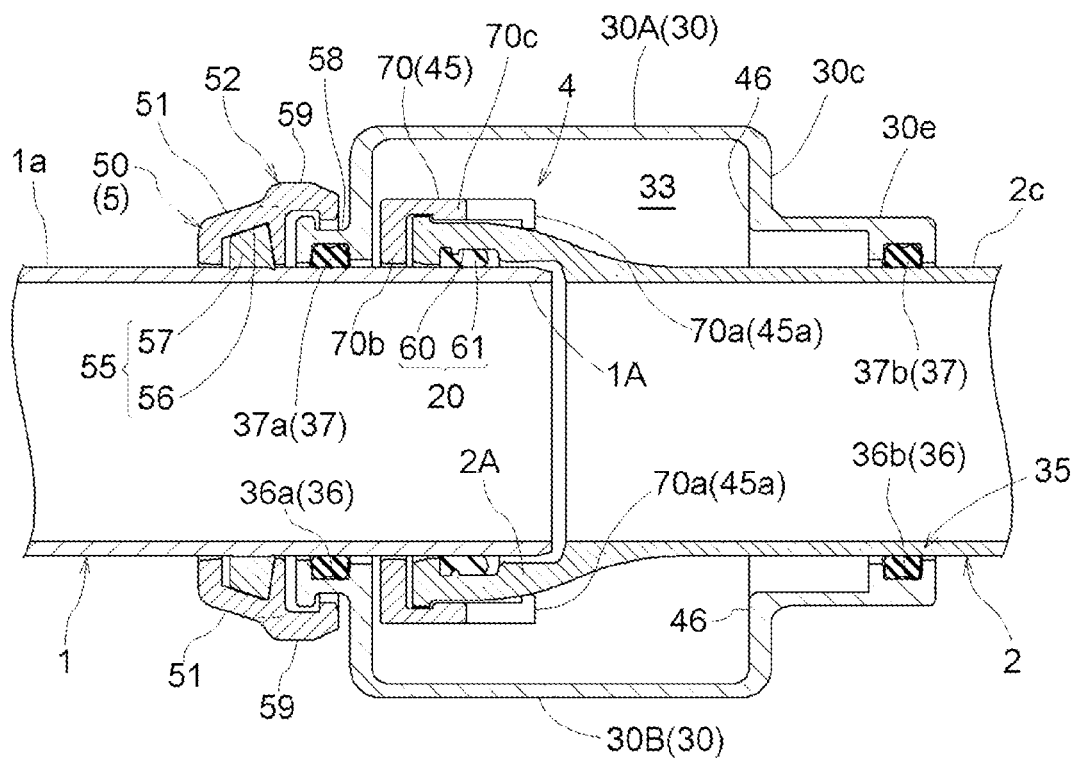
FIG. 22(a) is an overall sectional view at the time of assembly and FIG. 22(b) is an overall sectional view at the time of disengagement, showing an eighth embodiment of the disengagement prevention structure for a pipe connecting portion.
Figure 22B:
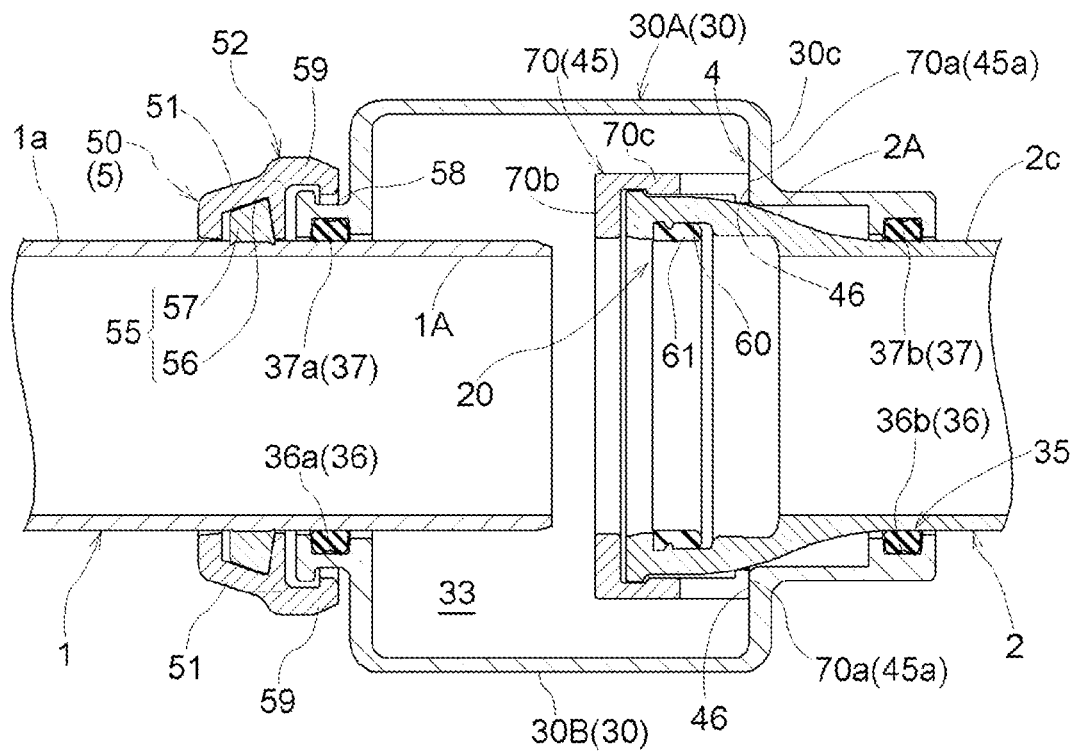

In a disengagement prevention structure for a pipe connecting portion shown in FIGS. 22(a) and 22(b), the fitting connection part 20 between the spigot portion 1A of the fluid pipe 1 on one side and the socket portion 2A of the fluid pipe 2 on the other side is configured with a T-shaped mechanical joint. In the disengagement prevention structure for a pipe connecting portion, an improvement of the first disengagement blocking part 4 that blocks, by contact, a relative disengagement movement beyond a certain level between the socket portion 2A of the fluid pipe 2 on the other side and the collar 30 is shown.

In the first disengagement blocking part 4 of the present embodiment, as an example of the contact member 45 which is fixed to the socket portion 2A side of the fluid pipe 2 on the other side, a metal contact band 70 having a divided structure (a two-divided structure in the present embodiment), which clamps and is fixed to the socket portion 2A of the fluid pipe 2 from the outer side in the pipe radial direction, is used. The contact band 70 is provided with an annular first positioning portion 70b that comes into contact with an end surface on the connection portion side of the socket portion 2A, and a second positioning portion 70c that comes into contact with a tapered portion of the outer peripheral surface 2c of the socket portion 2A. Therefore, in a state where the contact band 70 is fastened and fixed to the outer peripheral surface of the socket portion 2A, the movement in the pipe axis direction of the contact band 70 is blocked due to the first positioning portion 70b and the second positioning portion 70c.

A tip surface 70a of the second positioning portion 70c of the contact band 70 is configured as the contact surface 45a of the contact member 45. The inner surface portion facing the tip surface 70a of the second positioning portion 45c of the contact band 70 in the pipe axis direction, of the inner surface of the side wall portion 30c on the other end side in the pipe axis direction of the collar 30, is configured as the contact surface 46. Also in this case, the contact surface 46 of the collar 30 and the tip surface 70a of the contact band 70 fixed to the socket portion 2A are formed on the orthogonal planes orthogonal to the pipe axis. In this way, the contact surface 46 of the collar 30 and the contact surface 45a of the contact band 70 come into contact with each other in a surface contact manner, so that the disengagement force can be reliably received to improve the disengagement blocking effect.

Further, since the other configurations are the same as the configurations described in the fourth embodiment, the same configuration parts are denoted by the same reference numerals as those in the fourth embodiment and the description thereof is omitted.

Ninth Embodiment

Figure 23A:
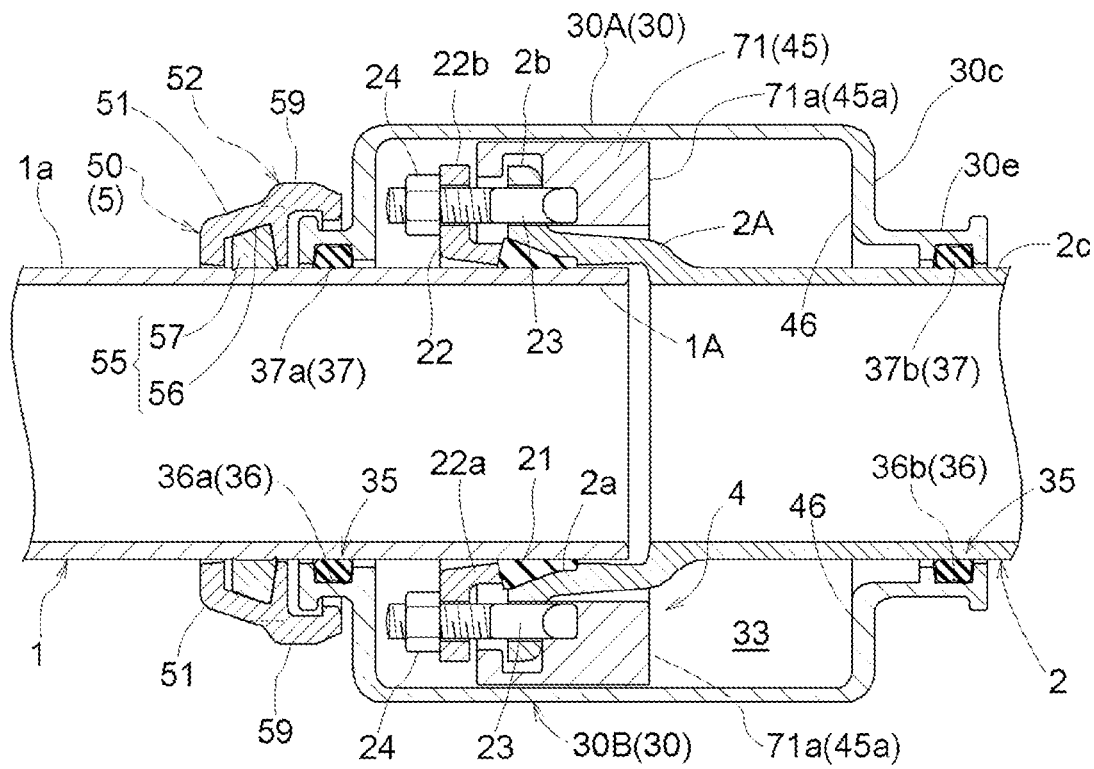
FIG. 23(a) is an overall sectional view at the time of assembly and FIG. 23(b) is an overall sectional view at the time of disengagement, showing a ninth embodiment of the disengagement prevention structure for a pipe connecting portion.
Figure 23B:
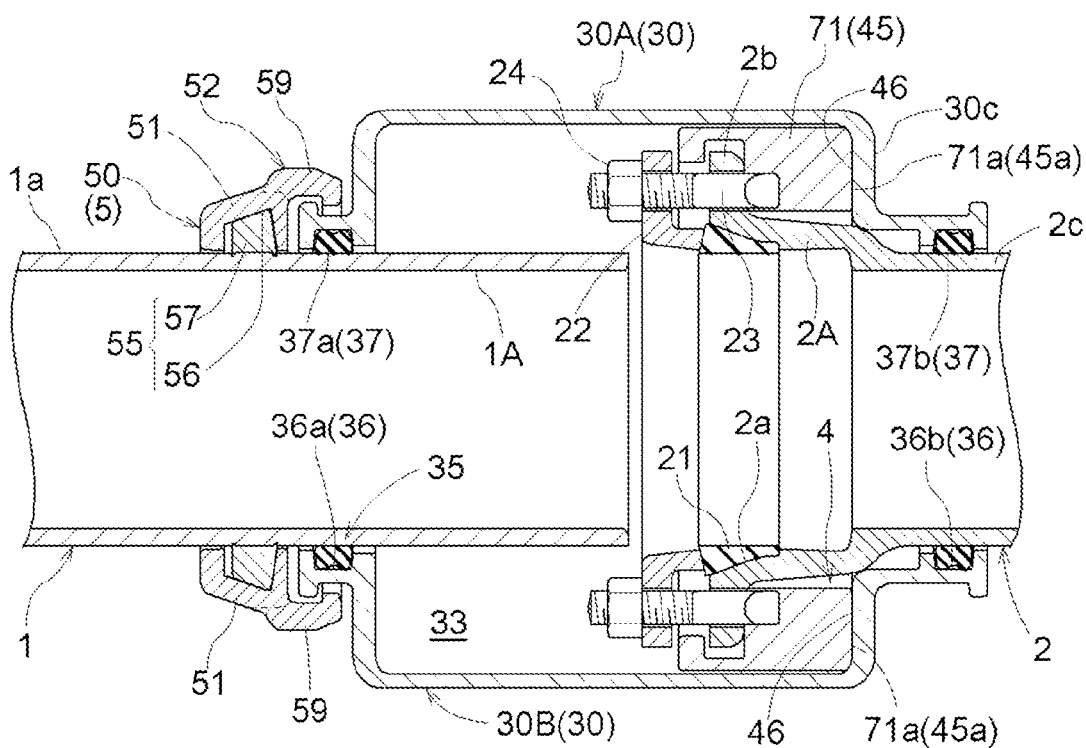

In a disengagement prevention structure for a pipe connecting portion shown in FIGS. 23(a) and 23(b), the fitting connection part 20 between the spigot portion 1A of the fluid pipe 1 on one side and the socket portion 2A of the fluid pipe 2 on the other side is configured with a K-shaped mechanical joint. In the disengagement prevention structure for a pipe connecting portion, an improvement of the first disengagement blocking part 4 that blocks, by contact, a relative disengagement movement beyond a certain level between the socket portion 2A of the fluid pipe 2 on the other side and the collar 30 is shown.

In the first disengagement blocking part 4 of the present embodiment, as an example of the contact member 45 that is fixed to the socket portion 2A side of the fluid pipe 2 on the other side, a socket portion band 71 made of metal, which clamps and is fixed to the flange portion 2b of the socket portion 2A in a state of being engaged with the flange portion 2b from the outer side in the pipe radial direction, is used. A tip surface 71a of the socket portion band 71 is configured as the contact surface 45a of the contact member 45. The inner surface portion facing the tip surface 71a of the socket portion band 71 in the pipe axis direction, of the inner surface of the side wall portion 30c on the other end side in the pipe axis direction of the collar 30, is configured as the contact surface 46.

Also in this case, each of the contact surface 46 of the collar 30 and the tip surface 71a of the socket portion band 71 fixed to the socket portion 2A is formed on the orthogonal plane orthogonal to the pipe axis. In this way, the contact surface 46 of the collar 30 and the contact surface 45a of the socket portion band 71 come into contact with each other in a surface contact manner, so that the disengagement force can be reliably received to improve the disengagement blocking effect.

Further, since the other configurations are the same as the configurations described in the fourth embodiment, the same configuration parts are denoted by the same reference numerals as those in the fourth embodiment and the description thereof is omitted.

Tenth Embodiment

Figure 24:
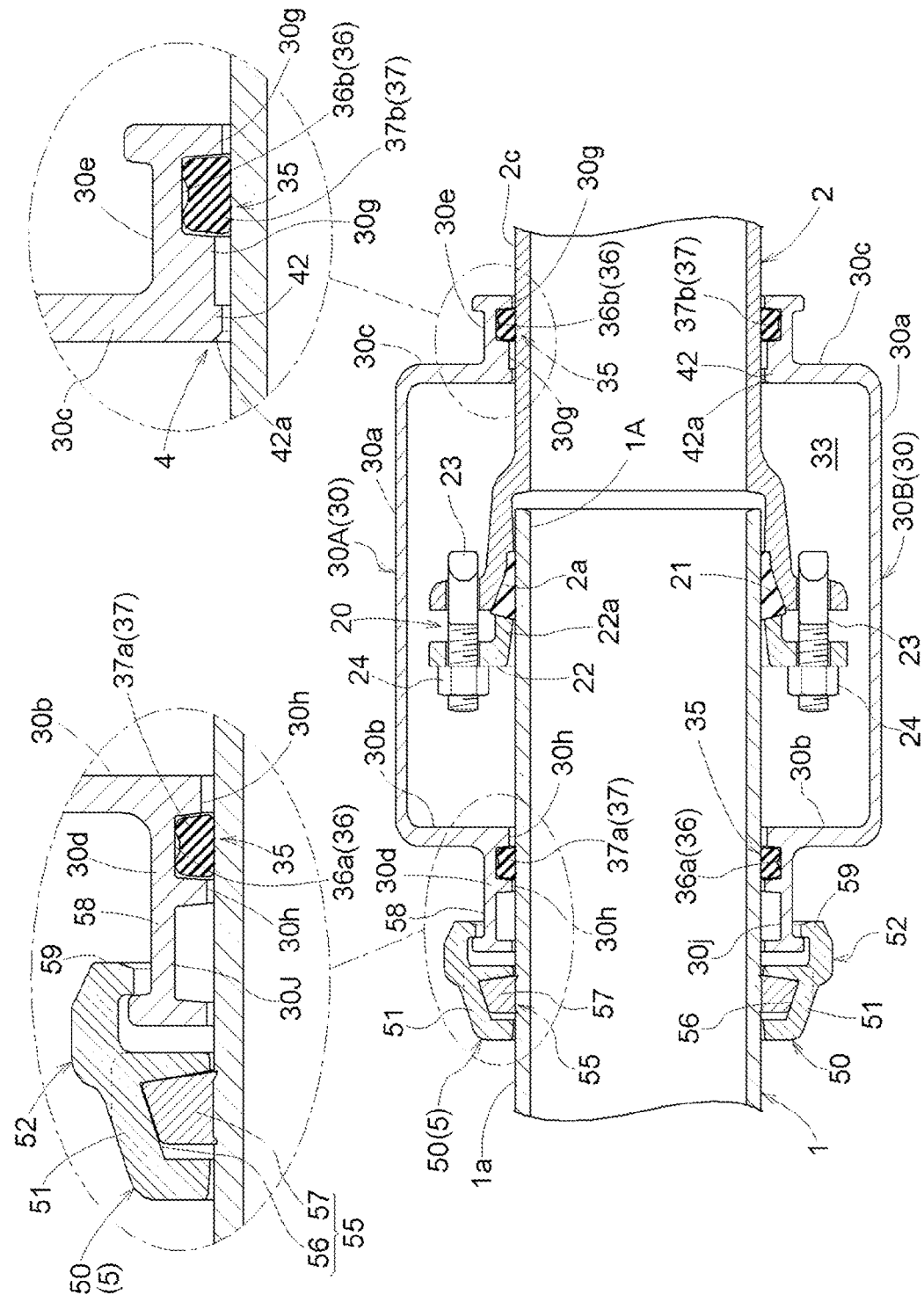
FIG. 24 is an overall sectional view at the time of assembly, showing a tenth embodiment of the disengagement prevention structure for a pipe connecting portion.

In a disengagement prevention structure for a pipe connecting portion shown in FIG. 24, the fitting connection part 20 between the spigot portion 1A of the fluid pipe 1 on one side and the socket portion 2A of the fluid pipe 2 on the other side is configured with a K-shaped mechanical joint. In the disengagement prevention structure for a pipe connecting portion, an improvement of the earthquake-proof reinforcement metal fitting 50 having a divided structure, which integrally fixes and connects the spigot portion 1A of the fluid pipe 1 on one side and the pipe support portion 30d on one end side in the pipe axis direction of the collar 30, is shown.

In the earthquake-proof reinforcement metal fitting 50 of the present embodiment, an extension pipe support portion 30j having an annular space that is open inward in the radial direction is integrally formed on the end portion side which is located on the earthquake-proof reinforcement metal fitting 50 side with respect to a first circumferential direction groove portion 36a of the seal holding groove 36 formed on the inner peripheral surface of the pipe support portion 30d and a first circumferential direction seal portion 37a mounted into the first circumferential direction groove portion 36a, of the pipe support portion 30d on one end side in the pipe axis direction of the collar 30.

The annular engagement recess 58 that is open outward in the radial direction is formed on the outer peripheral surface of the pipe support portion 30d on one end side which includes the extension pipe support portion 30j. The engagement protrusion 59 integrally formed with the divided clamping member 51 of the earthquake-proof reinforcement metal fitting 50 is engaged with the outer end side portion of a range corresponding to the extension pipe support portion 30j, of the engagement recess 58, from the outer side in the pipe radial direction.

In the case of the present embodiment, the engagement position of the engagement protrusion 59 of the earthquake-proof reinforcement metal fitting 50 with respect to the pipe support portion 30d on one end side of the collar 30 is separated toward the outer end side with respect to the first circumferential direction groove portion 36a of the seal holding groove 36 formed on the inner peripheral surface of the pipe support portion 30d and the first circumferential direction seal portion 37a of the second seal member 37 mounted into the first circumferential direction groove portion 36a. Therefore, as shown in FIG. 17, in the disengaged state where the connection of the spigot portion 1A and the socket portion 2A is released, bending between the spigot portion 1A and the pipe support portion 30d on one end side of the collar 30 can be suppressed. In this way, the bent state between the spigot portion 1A of the fluid pipe 1 and the pipe support portion 30d on one end side of the collar 30 is maintained within an appropriate range, so that leakage of a fluid due to a local decrease in the sealing performance in the circumferential direction of the seal part 35 can be suppressed.

Eleventh Embodiment

Figure 25A:
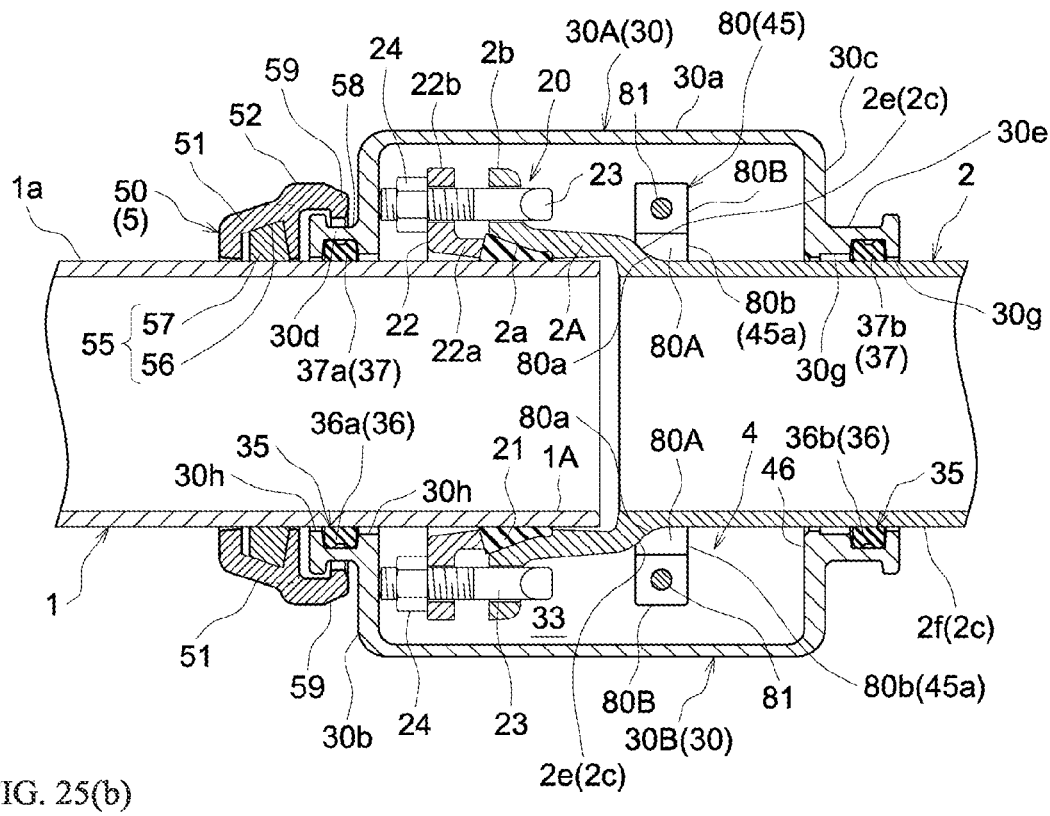
FIG. 25(a) is an overall sectional view at the time of assembly and FIG. 25(b) is an overall sectional view at the time of disengagement, showing an eleventh embodiment of the disengagement prevention structure for a pipe connecting portion.
Figure 25B:
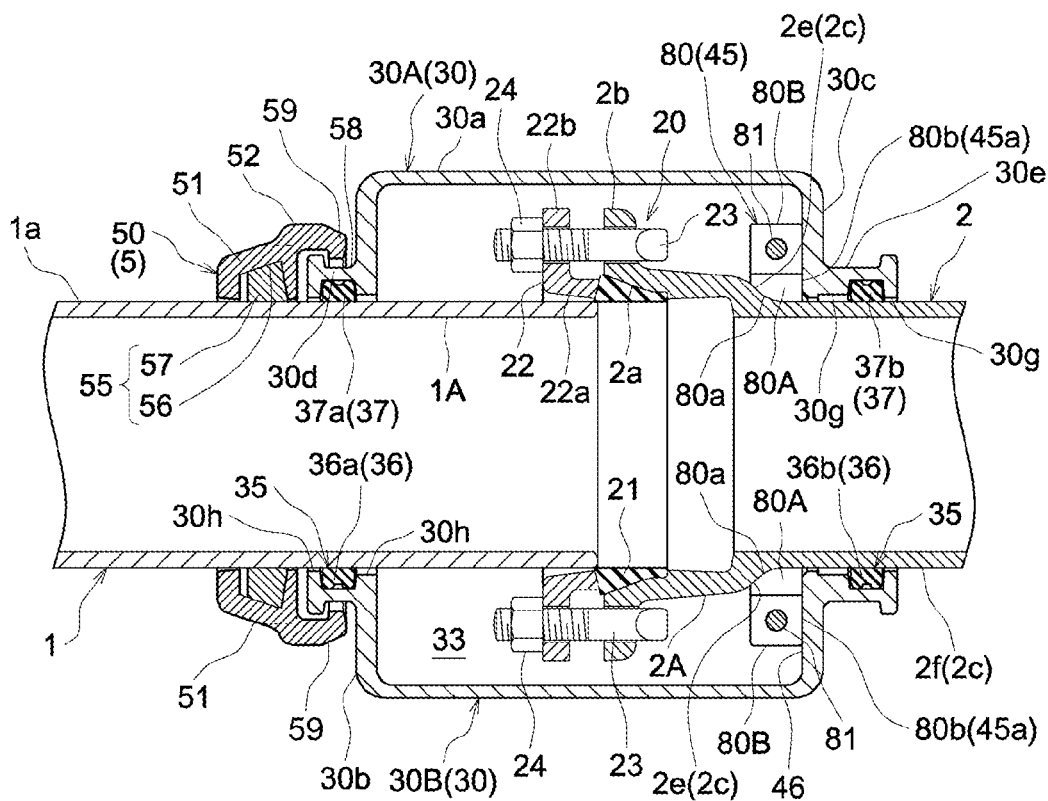

In a disengagement prevention structure for a pipe connecting portion shown in FIGS. 25(a) and 25(b), the fitting connection part 20 between the spigot portion 1A of the fluid pipe 1 on one side and the socket portion 2A of the fluid pipe 2 on the other side is configured with a K-shaped mechanical joint. In the disengagement prevention structure for a pipe connecting portion, an improvement of the first disengagement blocking part 4 that blocks, by contact, a relative disengagement movement beyond a certain level between the socket portion 2A of the fluid pipe 2 on the other side and the collar 30 is shown.

In the first disengagement blocking part 4 of the present embodiment, as an example of the contact member 45 which is fixed to the socket portion 2A side of the fluid pipe 2 on the other side, a metal clamping ring 80 having a divided structure (two-divided structure in the present embodiment), which can detachably clamp and be fixed to a bent portion extending over the tapered outer peripheral surface portion 2e and a straight outer peripheral surface portion 2f in the outer peripheral surface 2c of the socket portion 2A, from the outer side in the pipe radial direction, is used. The clamping ring 80 is provided with a semicircular arc-shaped divided ring 80A divided into two in the pipe circumferential direction. The pair of divided rings 80A firmly clamps and is fixed to the bent portion of the socket portion 2A by fastening and connecting connection pieces 80B provided at both end portions thereof in the pipe circumferential direction with bolts 81.

One end surface 80a in the pipe axis direction of the clamping ring 80 is configured as a tapered end surface that comes into contact with the tapered outer peripheral surface portion 2e in the outer peripheral surface 2c of the socket portion 2A in a surface contact state. The other end surface 80b in the pipe axis direction of the clamping ring 80 includes the other end surface in the pipe axis direction of the divided ring 80A and the other end surface in the pipe axis direction of the connection piece 80B, and is configured as the contact surface 45a of the contact member 45. The inner surface of the side wall portion 30c on the other end side in the pipe axis direction of the collar 30 is configured as the contact surface 46 which can come into contact with the other end surface 80b of the clamping ring 80 from the pipe axis direction. The contact surface 46 which is configured with the inner surface of the side wall portion 30c of the collar 30 and the contact surface 45a which is configured with the other end surface 80b of the clamping ring 80 are formed on orthogonal planes orthogonal to the pipe axis.

When a disengagement force due to an earthquake, uneven settlement, or the like acts on the fitting connection part 20 between the spigot portion 1A of the fluid pipe 1 on one side and the socket portion 2A of the fluid pipe 2 on the other side, the contact surface 46 formed on the inner surface of the side wall portion 30c on the other end side of the collar 30 comes into contact with the other end surface 80b of the clamping ring 80 which clamps and is fixed to the bent portion in the outer peripheral surface 2c of the socket portion 2A, from the pipe axis direction. The tapered one end surface 80a of the clamping ring 80 comes into contact with the tapered outer peripheral surface portion 2e in the outer peripheral surface 2c of the socket portion 2A in a surface contact state from the pipe axis direction. Due to this contact, the disengagement force can be firmly received. Nevertheless, since the contact surface 46 of the collar 30 and the contact surface 45a configured with the other end surface 80b of the clamping ring 80 are in a surface contact state along the direction orthogonal to the pipe axis, the pushing-opening force of the divided joint portion, which acts on the collar 30 at the time of contact, is reduced, as a result of which it is possible to suppress a decrease in sealing performance (a decrease in surface pressure of the second seal member 37) at the divided joint portion of the collar 30.

Further, since the other configurations are the same as the configurations described in the fourth embodiment, the same configuration parts are denoted by the same reference numerals as those in the fourth embodiment and the description thereof is omitted.

Other Embodiments (1) In the first embodiment described above, the tilt restricting element 90 is provided with the tilt restricting surface 90a that comes into contact with the outer surface of the spigot portion 1A that is tilted with respect to the pipe support portion 30d on one end side of the collar 30 to restrict the tilt of the spigot portion 1A, and the tilt restricting protrusion portion 95 that comes into contact with the inner surface of the collar 30 according to the tilt of the spigot portion 1A with respect to the pipe support portion 30d on one end side of the collar 30 to restrict further tilt of the spigot portion 1A. However, there is no limitation to the configuration, and for example, it may be carried out with only the tilt restricting surfaces 90a on one side or the tilt restricting protrusion portion 95.

(2) In the second example of the tilt restricting element 90 described above, the contact position with respect to the inner surface of the collar 30 is changed in the pipe radial direction by the screwing operation of the tilt restricting bolt 95B. However, there is no limitation to this configuration, and for example, a plurality of tilt restricting protrusion portions 95 having different lengths in the pipe radial direction may be configured to be selectively replaced with respect to the tilt restricting element 90, and the contact position with respect to the inner surface of the collar 30 may be changed in the pipe radial direction by replacing the tilt restricting protrusion portion 95.

(3) In each of the embodiments described above, in the disengaged state where the connection of the spigot portion 1A and the socket portion 2A is released, the end portion of the spigot portion 1A is set to be in a state of falling out from the first seal member 21. However, even in a case where the end portion of the spigot portion 1A is located at the first seal member 21, it is in the disengaged state where the connection of the spigot portion 1A and the socket portion 2A is substantially released.

INDUSTRIAL APPLICABILITY

The present invention can be suitably used for a disengagement prevention structure of a pipe connecting portion which reliably blocks a disengagement movement of a spigot portion and a socket portion with respect to a collar while improving absorption capacity with respect to a disengagement force, and maintains a bent state between the spigot portion and a pipe support portion on one end side of the collar within an appropriate range to suppress leakage of a fluid due to a local decrease in sealing in a circumferential direction of a seal part.

The invention claimed is:

1. A disengagement prevention structure for a pipe connecting portion, comprising:
   a collar having a divided structure and surrounding a fitting connection part between a spigot portion of a first pipe portion on one side and a socket portion of a second pipe portion on the other side in a sealed state, the collar being externally mounted over both the spigot portion of the first pipe portion and the socket portion of the second pipe portion;
   a first disengagement blocking part, which allows a relative disengagement movement to a disengaged state where connection of the socket portion and the spigot portion is released, and blocks, by contact, a relative disengagement movement beyond a certain level between the socket portion and the collar in the disengaged state, the first disengagement blocking part being provided at a location where the collar and a socket portion side of the second pipe portion on the other side face each other in a pipe axis direction;
   a second disengagement blocking part provided with a retaining part in which falling-off resistance between the retaining part and an outer peripheral surface of the spigot portion increases according to a disengagement movement of the spigot portion, the second disengagement blocking part being provided on a pipe support portion side on one end side in the pipe axis direction of the collar; and
   a tilt restricting part including a tilt restricting element having a divided structure, a tilt restricting surface capable of coming into contact with an outer surface of the spigot portion that is tilted in the disengaged state, and a fixing connection part that fixedly connects the tilt restricting element to the socket portion.

2. The disengagement prevention structure for a pipe connecting portion according to claim 1, wherein the tilt restricting part restricts tilt of the spigot portion with respect to the pipe support portion on the one end side of the collar in the disengaged state and is provided within the collar.

3. The disengagement prevention structure for a pipe connecting portion according to claim 2, wherein the tilt restricting element is externally mounted to the spigot portion in a state where the socket portion and the spigot portion are fitted and connected to each other and is externally mounted to the spigot portion in the disengaged state.

4. The disengagement prevention structure for a pipe connecting portion according to claim 3, wherein the tilt restricting element is provided with a tilt restricting protrusion portion that comes into contact with an inner surface of the collar according to a tilt of the spigot portion in the disengaged state.

5. The disengagement prevention structure for a pipe connecting portion according to claim 4, wherein the tilt restricting protrusion portion is configured such that a contact position with respect to the inner surface of the collar is changeable in a pipe radial direction.

6. The disengagement prevention structure for a pipe connecting portion according to claim 3, wherein the fitting connection part comprises a seal member that is mounted between the outer peripheral surface of the spigot portion and a tapered inner peripheral surface of the socket portion, a push ring that is movably and externally mounted to the spigot portion and has a pressing portion pressing the seal member from the pipe axis direction, and a fastener that fastens and fixes the socket portion and the push ring from the pipe axis direction, in which the fixing connection part of the tilt restricting part is configured with the fastener of the fitting connection part.

7. The disengagement prevention structure for a pipe connecting portion according to claim 3, wherein the fitting connection part comprises a seal holding groove that is formed on the inner peripheral surface of the socket portion and is open inward in the radial direction, and a seal member that is compressed in a sealed state against the outer peripheral surface of the spigot portion fitted and connected to the socket portion and mounted into the seal holding groove, and wherein the fixing connection part of the tilt restricting part includes an engagement protrusion provided at the tilt restricting element in a state of being engageable with an inner side surface of an annular protrusion formed at an end portion of an outer peripheral surface of the socket portion from the pipe axis direction, and a fastener that fastens and fixes divided tilt restricting members of the tilt restricting element in a state of clamping the spigot portion and in a state where the engagement protrusion of the tilt restricting element is engaged with the annular protrusion of the socket portion.

8. A disengagement prevention structure for a pipe connecting portion, comprising:
a collar having a divided structure and surrounding a fitting connection part between a spigot portion of a first pipe portion on one side and a socket portion of a second pipe portion on the other side in a sealed state, the collar being externally mounted over both the spigot portion of the first pipe portion and the socket portion of the second pipe portion;
a seal part for sealing between an inner peripheral surface of a second pipe support portion and an outer peripheral surface of the spigot portion, the seal part being provided in one end portion of the collar in a pipe axis direction, and an other seal part for sealing between an inner peripheral surface of a pipe support portion and an outer peripheral surface of the socket portion, the other seal part being provided in an other end portion of the collar in the pipe axis direction;
a first disengagement blocking part, which allows a relative disengagement movement to a disengaged state where connection of the socket portion and the spigot portion is released, and blocks, by contact, a relative disengagement movement beyond a certain level between the socket portion and the collar in the disengaged state, the first disengagement blocking part being provided at a location where the collar and a socket portion side of the second pipe portion on the other side face each other in a pipe axis direction; and
a second disengagement blocking part provided with a retaining part in which falling-off resistance between the retaining part and an outer peripheral surface of the spigot portion increases according to a disengagement movement of the spigot portion, the second disengagement blocking part being provided on a pipe support portion side on one end side in the pipe axis direction of the collar,
wherein the other seal part provided in the other end portion of the collar in the pipe axis direction comprises two circumferential direction groove portions formed along the pipe circumferential direction on the inner surface of the second pipe support portion at an interval in the pipe axis direction, each of the circumferential direction groove portions receiving a seal member.

9. The disengagement prevention structure for a pipe connecting portion according to claim 8,
wherein the first disengagement blocking part includes a contact surface formed in an inner surface of a side wall portion on an other end side of the collar, and a contact member with a contact surface fixed to the socket portion of the second pipe portion to face the contact surface of the collar in the pipe axis direction,
wherein each of the contact surface of the collar and the contact surface of the contact member is formed on an orthogonal plane orthogonal to the pipe axis,
wherein the fitting connection part includes a first seal member mounted between the outer peripheral surface of the spigot portion and an inner peripheral surface of the socket portion, a push ring with a pressing portion capable of pressing the first seal member from the pipe axis direction, the push ring being movably and externally mounted to the spigot portion, and a fastener including a plurality of T-head bolts and nuts for fixedly fastening the socket portion and the push ring at plural positions in a pipe circumferential direction, and
wherein the contact member is formed by the plurality of T-head bolts, and each of the T-head bolts has a top surface configured as a contact surface coming into contact with the contact surface of the side wall portion facing each T-head bolt in a surface contact manner from the pipe axis direction.

10. A disengagement prevention structure for a pipe connecting portion, comprising:
a collar having a divided structure and surrounding a fitting connection part between a spigot portion of a first pipe portion on one side and a socket portion of a second pipe portion on the other side in a sealed state, the collar being externally mounted over both the spigot portion of the first pipe portion and the socket portion of the second pipe portion;
a first disengagement blocking part, which allows a relative disengagement movement to a disengaged state where connection of the socket portion and the spigot portion is released, and blocks, by contact, a relative disengagement movement beyond a certain level between the socket portion and the collar in the disengaged state, the first disengagement blocking part being provided at a location where the collar and a socket portion side of the second pipe portion on the other side face each other in a pipe axis direction; and a second disengagement blocking part provided with a retaining part in which falling-off resistance between the retaining part and an outer peripheral surface of the spigot portion increases according to a disengagement movement of the spigot portion, the second disengagement blocking part being provided on a pipe support portion side on one end side in the pipe axis direction of the collar, wherein the first disengagement blocking part is provided by a disengagement blocking portion configured to come into contact with an outer peripheral surface of the socket portion, the disengagement blocking portion being formed on an inner peripheral surface side of a second pipe support portion side on an other end side in the pipe axis direction of the collar and at a location shifted toward a center side in the pipe axis direction of the collar with respect to a seal part for sealing between the inner peripheral surface of the second pipe support portion and the outer peripheral surface of the second pipe portion, and wherein a distance from the contact position of the disengagement blocking portion to a first end of a seal holding groove of the seal part, proximal to the contact position, is configured to be larger than a thickness dimension in the pipe axis direction in an inner partition wall of partition walls on both sides in the pipe axis direction of a second seal holding groove of second a seal part formed on an inner peripheral surface of the pipe support portion on the one end side, the second seal part being configured to seal between the inner peripheral surface of the pipe support portion and an outer peripheral surface of the first pipe portion.

\* \* \* \* \*

UNITED STATES PATENT AND TRADEMARK OFFICE
CERTIFICATE OF CORRECTION

| | | |
|---|---|---|
| PATENT NO. | : 12,031,649 B2 | |
| APPLICATION NO. | : 17/601789 | |
| DATED | : July 9, 2024 | |
| INVENTOR(S) | : Mitsuhiro Mori et al. | |

It is certified that error appears in the above-identified patent and that said Letters Patent is hereby corrected as shown below:

In the Claims

Column 33, Line 27, Claim 10, delete "groove of second a" and insert -- groove of a second --

Signed and Sealed this
Seventeenth Day of September, 2024

*Katherine Kelly Vidal*

Katherine Kelly Vidal
*Director of the United States Patent and Trademark Office*